US012634183B2

(12) United States Patent
Gong et al.

(10) Patent No.: US 12,634,183 B2
(45) **Date of Patent: *May 19, 2026**

(54) CYCLIC SHIFT DIVERSITY-BASED COMMUNICATION METHOD AND APPARATUS

(71) Applicant: HUAWEI TECHNOLOGIES CO., LTD., Shenzhen (CN)

(72) Inventors: Bo Gong, Shenzhen (CN); Chenchen Liu, Shenzhen (CN); Ming Gan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 344 days.

This patent is subject to a terminal disclaimer.

(21) Appl. No.: 18/453,473

(22) Filed: Aug. 22, 2023

(65) Prior Publication Data

US 2023/0396475 A1      Dec. 7, 2023

Related U.S. Application Data

(63) Continuation of application No. PCT/CN2022/077307, filed on Feb. 22, 2022.

(30) Foreign Application Priority Data

Feb. 23, 2021      (CN) .......................... 202110201124.6

(51) Int. Cl.
*H04L 5/00*          (2006.01)
*H04B 7/06*          (2006.01)
*H04L 27/26*         (2006.01)

(52) U.S. Cl.
CPC ........ *H04L 27/2607* (2013.01); *H04L 5/0044* (2013.01)

(58) Field of Classification Search
CPC . H04L 27/2607; H04L 5/0044; H04B 7/0667; H04B 7/0684
See application file for complete search history.

(56) References Cited

U.S. PATENT DOCUMENTS

| | | | |
|---|---|---|---|
| 2019/0261352 A1 | 8/2019 | Cariou et al. | |
| 2020/0112469 A1 | 4/2020 | Sakamoto et al. | |

(Continued)

FOREIGN PATENT DOCUMENTS

| | | |
|---|---|---|
| CN | 106130945 A | 11/2016 |
| CN | 108028691 A | 5/2018 |
| CN | 105830380 B | 2/2020 |

(Continued)

OTHER PUBLICATIONS

Japanese Office Action issued in corresponding Japanese Application No. 2023-551242, dated Sep. 30, 2024, pp. 1-9.

(Continued)

*Primary Examiner* — Kent Krueger
(74) *Attorney, Agent, or Firm* — HAUPTMAN HAM, LLP

(57) ABSTRACT

A cyclic shift diversity-based communication method and apparatus. A maximum number of antennas supported in this method is greater than 8. A cyclic shift is performed on a first preamble part of each antenna by using a cyclic shift diversity value, so that an automatic gain control error is reduced in response to the use of more antennas (for example, 16 antennas).

18 Claims, 5 Drawing Sheets

100

(56) References Cited

U.S. PATENT DOCUMENTS

| | | | |
|---|---|---|---|
| 2021/0204299 A1* | 7/2021 | Yun | H04W 72/542 |
| 2022/0278771 A1* | 9/2022 | Park | H04L 1/0057 |

FOREIGN PATENT DOCUMENTS

| | | |
|---|---|---|
| CN | 111817764 A | 10/2020 |
| WO | 2021029551 A1 | 2/2021 |

OTHER PUBLICATIONS

IEEE Std 802.11ac-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHZ, Approved Dec. 11, 2013, total 425 pages.

802.11.2020—IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications, 4379 pages.

IEEE P802.11ax/D8.0, Oct. 2020, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, 820 pages.

International Search Report issued in corresponding International Application No. PCT/CN2022/077307, dated Apr. 29, 2022, pp. 1-9.

* cited by examiner

100

200

CYCLIC SHIFT DIVERSITY-BASED COMMUNICATION METHOD AND APPARATUS

CROSS-REFERENCE TO RELATED APPLICATIONS

This application is a continuation of International Application No. PCT/CN2022/077307, filed on Feb. 22, 2022, which claims priority to Chinese Patent Application No. 202110201124.6, filed on Feb. 23, 2021. The disclosures of the aforementioned applications are hereby incorporated by reference in their entireties.

BACKGROUND

In a wireless local area network (wireless local area network, WLAN) technology, the institute of electrical and electronics engineers (institute of electrical and electronics engineers, IEEE) has introduced a multi-input multi-output (multi-input multi-output, MIMO) technology on the basis of an orthogonal frequency division multiplexing (orthogonal frequency division multiplexing, OFDM) technology to support multi-antenna transmission. A maximum number of antennas supported in the IEEE 802.11n protocol is four, the maximum number of antennas supported in the IEEE 802.11ac protocol is expanded to eight, and the IEEE 802.11ax protocol inherits the maximum number of antennas supported in the 802.11ac protocol.

With development of technologies, a new communication protocol (for example, the IEEE 802.11be protocol) supports transmission of more than eight antennas (for example, 16 antennas) and more antennas. However, a current 8-antenna transmission technology does meet the new communication protocol. Therefore, how to perform communication based on more antennas is a problem of attention.

SUMMARY

Embodiments described herein provide a cyclic shift diversity-based communication method and apparatus. A maximum number of antennas supported in this method is greater than 8, and cyclic shift is performed on a first preamble part of each antenna by using a cyclic shift diversity value, so that an automatic gain control (automatic gain control, AGC) error is reduced in a scenario in which transmission using more antennas (for example, 16 antennas) is supported.

According to a first aspect, a cyclic shift diversity-based communication method, where a maximum number of antennas supported in the method is M, M is a positive integer greater than 8, and the method includes:

generating a physical layer protocol data unit PPDU, where the PPDU includes a first preamble part; and sending the PPDU by using N antennas, where cyclic shift is performed, based on a cyclic shift diversity CSD value, on a first preamble part of a PPDU sent on an $i^{th}$ antenna of the N antennas, and N is a positive integer less than or equal to M.

For example, the CSD value is predefined in a protocol.

In an example, the first preamble part includes a legacy short training field (legacy-short training field, L-STF), a legacy long training field (legacy-long training field, L-LTF), and a legacy signal field (legacy-signal field, L-SIG).

In another example, the first preamble part includes an L-STF, an L-LTF, an L-SIG, and a signaling field defined in a new communication protocol.

For example, in 802.11 be, the first preamble part includes an L-STF, an L-LTF, an L-SIG, a repeated legacy-signal field (repeated legacy-signal field, RL-SIG), and a universal signal field (universal signal field, U-SIG).

For example, in 802.11 be, the first preamble part includes an L-STF, an L-LTF, an L-SIG, an RL-SIG, a U-SIG, and an extremely high throughput signal field (extremely high throughput signal field, EHT-SIG).

According to the cyclic shift diversity-based communication method provided in at least one embodiment, a maximum number of antennas supported in this method is greater than 8, and cyclic shift is performed on a first preamble part of each antenna by using a CSD value, so that an AGC error is reduced in a scenario in which transmission using more antennas (for example, 16 antennas) is supported.

With reference to the first aspect, in some implementations of the first aspect, M=16, and the CSD value belongs to a CSD set.

According to the cyclic shift diversity-based communication method provided in at least one embodiment, the maximum number of antennas is expanded to 16, and this method is better applicable to a communication scenario with high communication usage, to better improve a system capacity.

With reference to the first aspect, in some implementations of the first aspect, N=9, and the CSD value in the CSD set includes: 0, −175 ns, −87.5 ns, −62.5 ns, −200 ns, −187.5 ns, −100 ns, −50 ns, and −12.5 ns;

N=10, and the CSD value in the CSD set includes: 0, −175 ns, −87.5 ns, −62.5 ns, −200 ns, −187.5 ns, −100 ns, −50 ns, −12.5 ns, and −25 ns;

N=11, and the CSD value in the CSD set includes: 0, −175 ns, −87.5 ns, −200 ns, −187.5 ns, −100 ns, −50 ns, −12.5 ns, −25 ns, −37.5 ns, and −125 ns;

N=12, and the CSD value in the CSD set includes: 0, −175 ns, −200 ns, −187.5 ns, −100 ns, −50 ns, −12.5 ns, −25 ns, −37.5 ns, −75 ns, −162.5 ns, and −112.5 ns;

N=13, and the CSD value in the CSD set includes: 0, −87.5 ns, −200 ns, −187.5 ns, −100 ns, −50 ns, −12.5 ns, −25 ns, −37.5 ns, −75 ns, −162.5 ns, −125 ns, and −137.5 ns;

N=14, and the CSD value in the CSD set includes: 0, −175 ns, −62.5 ns, −200 ns, −187.5 ns, −100 ns, −50 ns, −12.5 ns, −25 ns, −37.5 ns, −75 ns, −150 ns, −112.5 ns, and −162.5 ns;

N=15, and the CSD value in the CSD set includes: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, and −137.5 ns; or N=16, and the CSD value in the CSD set includes: 0, −175 ns, −62.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

According to the cyclic shift diversity-based communication method provided in at least one embodiment, in response to the maximum number of antennas supported in the method being 16, a CSD set corresponding to each of 9 to 16 antennas is provided. The CSD set acts on the first preamble part, so that an AGC error is better reduced in a scenario in which transmission using 16 antennas is supported. In addition, in response to the maximum number of antennas supported in the method being 16 and a number of used antennas is 1 to 8, CSD sets corresponding to one to eight antennas in an earlier communication protocol (for example, the 802.11n protocol, the 802.11ac protocol, or the 802.11ax protocol) is used, so that the earlier communication protocol is compatible, thereby facilitating smooth evolution of a system.

With reference to the first aspect, in some implementations of the first aspect, $N=1$, and the CSD value in the CSD set includes 0;

$N=2$, and the CSD value in the CSD set includes: 0, −175 ns;

$N=3$, and the CSD value in the CSD set includes: 0, −175 ns, and −87.5 ns;

$N=4$, and the CSD value in the CSD set includes: 0, −175 ns, −87.5 ns, and −62.5 ns;

$N=5$, and the CSD value in the CSD set includes: 0, −175 ns, −87.5 ns, −62.5 ns, and −200 ns;

$N=6$, and the CSD value in the CSD set includes: 0, −87.5 ns, −200 ns, −187.5 ns, −125 ns, and −12.5 ns;

$N=7$, and the CSD value in the CSD set includes: 0, −87.5 ns, −62.5 ns, −200 ns, −187.5 ns, −100 ns, and −150 ns;

$N=8$, and the CSD value in the CSD set includes: 0, −200 ns, −187.5 ns, −100 ns, −50 ns, −25 ns, −125 ns, and −150 ns;

$N=9$, and the CSD value in the CSD set includes: 0, −175 ns, −87.5 ns, −200 ns, −187.5 ns, −100 ns, −50 ns, −12.5 ns, and −25 ns;

$N=10$, and the CSD value in the CSD set includes: 0, −175 ns, −200 ns, −187.5 ns, −100 ns, −50 ns, −12.5 ns, −25 ns, −137.5 ns, and −162.5 ns;

$N=11$, and the CSD value in the CSD set includes: 0, −87.5 ns, −200 ns, −187.5 ns, −100 ns, −50 ns, −12.5 ns, −25 ns, −37.5 ns, −137.5 ns, and −150 ns;

$N=12$, and the CSD value in the CSD set includes: 0, −175 ns, −87.5 ns, −200 ns, −187.5 ns, −100 ns, −12.5 ns, −25 ns, −37.5 ns, −75 ns, −150 ns, and −162.5 ns;

$N=13$, and the CSD value in the CSD set includes: 0, −175 ns, −62.5 ns, −187.5 ns, −100 ns, −50 ns, −12.5 ns, −25 ns, −37.5 ns, −75 ns, −150 ns, −162.5 ns, and −125 ns;

$N=14$, and the CSD value in the CSD set includes: 0, −175 ns, −87.5 ns, −187.5 ns, −100 ns, −50 ns, −12.5 ns, −25 ns, −37.5 ns, −75 ns, −150 ns, −125 ns, −162.5 ns, and −137.5 ns;

$N=15$, and the CSD value in the CSD set includes: 0, −175 ns, −87.5 ns, −200 ns, −187.5 ns, −100 ns, −50 ns, −12.5 ns, −25 ns, −75 ns, −125 ns, −162.5 ns, −137.5 ns, −112.5 ns, and −150 ns; or $N=16$, and the CSD value in the CSD set includes: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

According to the CSD-based communication method provided in at least one embodiment, in response to the maximum number of antennas supported in the method being 16, a CSD set corresponding to each of 1 to 16 antennas is provided. The CSD set acts on the first preamble part, so that an AGC error is better reduced in a scenario in which transmission using 16 antennas is supported.

With reference to the first aspect, in some implementations of the first aspect, the CSD is determined based on a range of a ratio of receive power of a legacy short training field L-STF of a PPDU to receive power of an extremely high throughput short training field EHT-STF of the PPDU.

With reference to the first aspect, in some implementations of the first aspect, the CSD is determined based on a first criterion value, and the first criterion value is a maximum value that is in ranges of ratios of receive power of the L-STF to receive power of the EHT-STF and that is obtained in a plurality of scenarios.

According to a second aspect, a cyclic shift diversity-based communication method, where the method includes:

receiving a physical layer protocol data unit PPDU, where the PPDU includes a first preamble part, the first preamble part is received based on a cyclic shift diversity CSD value, and the CSD value is a CSD value based on which a transmit end sends the first preamble part; and processing the PPDU.

According to a third aspect, a cyclic shift diversity-based communication apparatus is provided, where the apparatus is configured to perform the method provided in the first aspect. Specifically, the apparatus includes a module configured to perform any one of the first aspect.

According to a fourth aspect, a cyclic shift diversity-based communication apparatus is provided, where the apparatus is configured to perform the method provided in the second aspect. Specifically, the apparatus includes a module configured to perform any one of the second aspect.

According to a fifth aspect, a cyclic shift diversity-based communication apparatus is provided, including a processor. The processor is coupled to a memory, and is configured to execute instructions in the memory, to implement the method according to any one of the first aspect. Optionally, the apparatus further includes the memory. Optionally, the apparatus further includes a communication interface, and the processor is coupled to the communication interface.

According to a sixth aspect, a cyclic shift diversity-based communication apparatus is provided, including a processor. The processor is coupled to a memory, and is configured to execute instructions in the memory, to implement the method according to any one of the second aspect. Optionally, the apparatus further includes the memory. Optionally, the apparatus further includes a communication interface, and the processor is coupled to the communication interface.

According to a seventh aspect, a computer-readable storage medium is provided. The computer-readable storage medium stores a computer program. In response to the computer program being executed by an apparatus, the apparatus is enabled to implement the method according to any one of the first aspect.

According to an eighth aspect, a computer-readable storage medium is provided. The computer-readable storage medium stores a computer program. In response to the computer program being executed by an apparatus, the apparatus is enabled to implement the method according to any one of the second aspect.

According to a ninth aspect, a computer program product including instructions is provided. In response to the instructions being executed by a computer, an apparatus is enabled to implement the method provided according to any one of the first aspect.

According to a tenth aspect, a computer program product including instructions is provided. In response to the instructions being executed by a computer, an apparatus is enabled to implement the method according to any one of the second aspect.

DESCRIPTION OF EMBODIMENTS

Figure 1:
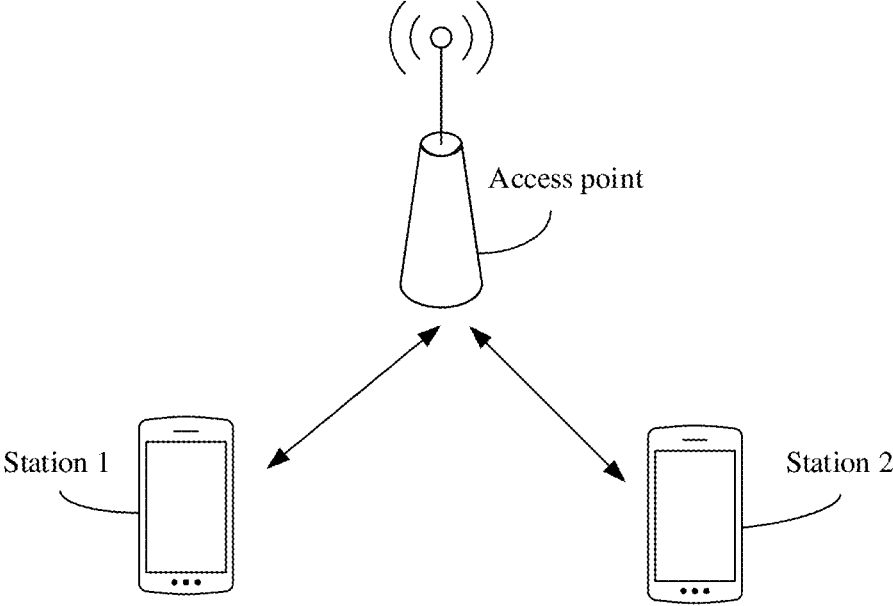
FIG. 1 is a schematic diagram of a communication system according to at least one embodiment.

The following describes technical solutions of embodiments with reference to accompanying drawings.

The technical solutions of at least one embodiment is applied to various communication systems, for example, a wireless local area network (wireless local area network, WLAN) communication system, a global system for mobile communications (global system of mobile communications, GSM), a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD), a universal mobile telecommunications system (universal mobile telecommunications system, UMTS), a worldwide interoperability for microwave access (worldwide interoperability for microwave access, WiMAX) communication system, a 5th generation (5th generation, 5G) system, or new radio (new radio, NR).

For example, the following describes an application scenario in at least one embodiment and a method in at least one embodiment by using a WLAN system as an example.

At least one embodiment is applied to a wireless local area network (wireless local area network, WLAN), and embodiments described herein are applicable to any one of the institute of electrical and electronics engineers (institute of electrical and electronics engineers, IEEE) 802.11 series protocols currently used in the WLAN. The WLAN includes one or more basic service sets (basic service set, BSS), and network nodes in the basic service set include an access point (access point, AP) and a station (station, STA).

In at least one embodiment, a transmit end is a user station (STA) in the WLAN. The user station is also referred to as a system, a subscriber unit, an access terminal, a mobile station, a remote station, a remote terminal, a mobile device, a user terminal, a terminal, a wireless communication device, a user agent, a user apparatus, or user equipment (user equipment, UE). The STA is a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless local area network (for example, Wi-Fi) communication function, a wearable device, a computing device, or another processing device connected to a wireless modem. Optionally, in these embodiments, a receive end is an AP in the WLAN.

In at least one embodiment, a transmit end alternatively is an AP in the WLAN. The AP is an access point for a mobile user to access a wired network; and is mainly deployed in a home, a building, and a campus, or is deployed outdoors. The AP is equivalent to a bridge that connects a wired network and a wireless network. The AP is mainly used to connect mobile users to each other, and then connect the wireless network to the Ethernet. For example, the AP is a terminal device or a network device with a wireless fidelity (wireless fidelity, Wi-Fi) chip. Optionally, the AP is a device that supports a plurality of WLAN standards such as the 802.11. Optionally, in these embodiments, a receive end is a STA in the WLAN.

For ease of understanding embodiments described herein, a communication system shown in FIG. 1 is first used as an example to describe in detail a communication system applicable to embodiments described herein. The communication system shown in FIG. 1 is a WLAN system. The WLAN system includes one or more APs and one or more STAs. In FIG. 1, one AP and two STAs are used as examples. Wireless communication is performed between the AP and the STA according to various standards. For example, wireless communication is performed between the AP and the STA by using a single-user multiple-input multiple-output (single-user multiple-input multiple-output, SU-MIMO) technology or a multi-user multiple-input multiple-output (multi-user multiple-input multiple-output, MU-MIMO) technology.

To facilitate understanding of embodiments described herein, a frame structure of a physical layer protocol data unit (PHY protocol data unit, PPDU) of the 802.11be protocol is first described with reference to FIG. 2 and FIG. 3.

Figure 2:
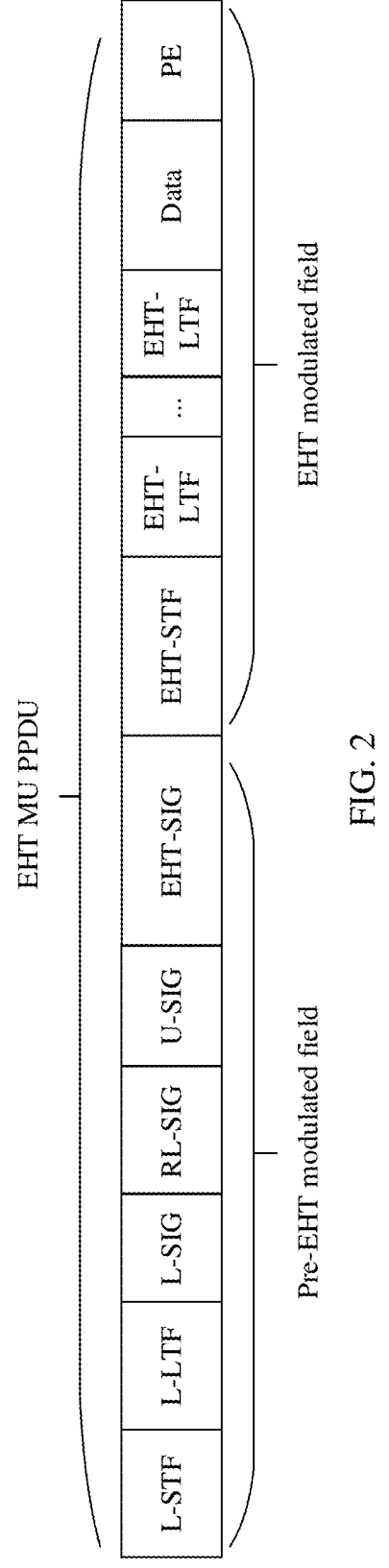
FIG. 2 is a schematic diagram of a frame structure of the 802.11be protocol according to at least one embodiment.

FIG. 2 is a schematic diagram of a frame structure of the 802.11be protocol according to at least one embodiment. The frame structure is a frame structure of an extremely high throughput (extremely high throughput, EHT) multi-user (multi-user, MU) PPDU in the 802.11be protocol.

Refer to FIG. 2. The EHT MU PPDU includes two parts. One part is a pre-EHT modulated field, including a legacy short training field (legacy-short training field, L-STF), a legacy long training field (legacy-long training field, L-LTF), a legacy signal field (legacy-signal field, L-SIG), a repeated legacy-signal field (repeated legacy-signal field, RL-SIG), a universal signal field (universal signal field, U-SIG), and an extremely high throughput signal field (extremely high throughput signal field, EHT-SIG). The other part is an EHT modulated field, including an extremely high throughput short training field (extremely high throughput short training field, EHT-STF), an extremely high throughput long training field (extremely high throughput long training field, EHT-LTF), and a data (data) field.

The U-SIG field occupies two OFDM symbols, and the U-SIG field includes a version independent information (version independent info) field, a version dependent information (version dependent info) field, a cyclic redundancy code (cyclic redundancy code, CRC) field, and a tail field. The version independent info field includes a wireless fidelity Wi-Fi version field of 3 bits, a downlink/uplink field of 1 bit, a BSS color field of at least 6 bits, and a transmission opportunity (transmit opportunity, TXOP) field of at least 7 bits. Optionally, the version independent info field further includes a bandwidth field, and the version dependent info field further includes a PPDU format field, and further includes one or more of a modulation and coding scheme field, a spatial stream field, an encoding field, and the like.

In at least one embodiment, the EHT-SIG includes an EHT-SIG common field and an EHT-SIG user specific field. The EHT-SIG common field carries resource allocation information allocated to a station, and the EHT-SIG user specific field carries user information.

Figure 3:
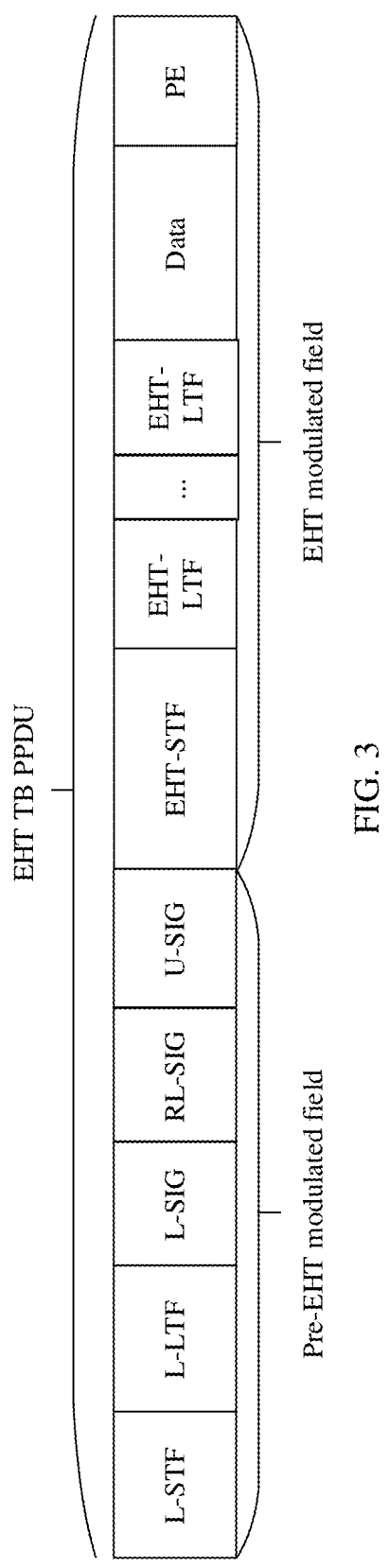
FIG. 3 is a schematic diagram of another frame structure of the 802.11be protocol according to at least one embodiment.

FIG. 3 is a schematic diagram of another frame structure of the 802.11be protocol according to at least one embodiment. The frame structure is a frame structure of an EHT trigger-based (trigger based, TB) PPDU in the 802.11be protocol.

Refer to FIG. 3. The EHT TB PPDU includes two parts: a pre-EHT modulated field and an EHT modulated field. The pre-EHT modulated field includes an L-STF, L-LTF, L-SIG, an RL-SIG, and a U-SIG, and the EHT modulated field includes an EHT-STF, an EHT-LTF, and a data field.

The frame structure of the EHT-PPDU in at least one embodiment is merely an example. In a standard formulation process or a technical development process, there is another structure. This is not limited in at least one embodiment.

In the foregoing frame structures and frame structures of the PPDU of various types that are not shown, for ease of description, a plurality of fields before the data field of the PPDU are collectively referred to as a preamble part, and the preamble part is used for data transmission. For example, the preamble part is used for carrier collection, channel estimation, and frame structure parameter (for example, a code rate or a frame length) transmission. For example, the preamble part includes the pre-EHT modulated field and the EHT-STF and the EHT-LTF in the EHT modulated field. In addition, a plurality of fields starting from the L-STF in the preamble part are denoted as a first preamble part.

In an example, the first preamble part includes an L-STF, an L-LTF, and an L-SIG.

In another example, the first preamble part includes an L-STF, an L-LTF, an L-SIG, and at least one signaling field newly defined in each generation of protocol.

For example, in the 802.11be protocol, the first preamble part includes all fields in the pre-EHT modulated field. To be specific, in FIG. 2, the first preamble part includes an L-STF, an L-LTF, an L-SIG, an RL-SIG, a U-SIG, and an EHT-SIG; and in FIG. 3, the first preamble part includes an L-STF, an L-LTF, an L-SIG, an RL-SIG, and a U-SIG.

Content of the first preamble part in the foregoing example is merely an example for description, and should not constitute a limitation on embodiments described herein.

To greatly improve a service transmission rate of a WLAN system, the institute of electrical and electronics engineers (institute of electrical and electronics engineers, IEEE) has introduced a MIMO technology on the basis of an orthogonal frequency division multiplexing (orthogonal frequency division multiplexing, OFDM) technology to support multi-antenna transmission.

To reduce an AGC error, in response to sending the PPDU, a transmit end performs cyclic shift diversity (cyclic shift diversity, CSD) on a first preamble part sent on each antenna, and sends, on each antenna, a first preamble part obtained after cyclic shift.

In response to a CSD value being set for each antenna, the CSD value needs to be properly designed to minimize the AGC error.

A maximum number of antennas supported in the 802.11n protocol is four, and CSD values corresponding to one to four antennas are defined. Table 1 shows a CSD set corresponding to each antenna number in the first preamble part (for example, the pre-HT modulated field) in 802.11n. A number of CSD values in one CSD set is the same as a number of antennas. In Table 1, cells not filled with data indicate that there is no corresponding CSD value.

Refer to Table 1. In response to a number of transmit antennas being 1, a CSD value corresponding to a $1^{st}$ antenna is 0 (that is, no cyclic shift is performed); in response to a number of transmit antennas being 2, a CSD value corresponding to a $1^{st}$ antenna is 0, and a CSD value corresponding to a $2^{nd}$ antenna is −200 nanoseconds (nanosecond, ns); in response to a number of transmit antennas being 3, a CSD value corresponding to a $1^{st}$ antenna is 0, a CSD value corresponding to a $2^{nd}$ antenna is −100 ns, and a CSD value corresponding to a $3^{rd}$ antenna is −200 ns; and in response to a number of transmit antennas being 4, a CSD value corresponding to a $1^{st}$ antenna is 0, a CSD value corresponding to a $2^{nd}$ antenna is −50 ns, a CSD value corresponding to a $3^{rd}$ antenna is −100 ns, and a CSD value corresponding to a $4^{th}$ antenna is −150 ns.

TABLE 1

| Number of transmit antennas (N) | CSD value on an antenna i (ns) | | | |
|---|---|---|---|---|
| | 1 | 2 | 3 | 4 |
| 1 | 0 | — | — | — |
| 2 | 0 | −200 | — | — |
| 3 | 0 | −100 | −200 | — |
| 4 | 0 | −50 | −100 | −150 |

A maximum number of antennas supported in the 802.11ac protocol is eighth, and CSD values corresponding to one to eight antennas are defined, as shown in Table 2 below. For related descriptions, refer to related descriptions in Table 1. For brevity, details are not described herein again. The 802.11ax protocol inherits the CSD value defined in the 802.11ac protocol, that is, the CSD value shown in Table 2 is also used in the 802.11ax protocol.

TABLE 2

| Number of transmit antennas (N) | CSD value on an antenna i (ns) | | | | | | | |
|---|---|---|---|---|---|---|---|---|
| | 1 | 2 | 3 | 4 | 5 | 6 | 7 | 8 |
| 1 | 0 | — | — | — | — | — | — | — |
| 2 | 0 | −200 | — | — | — | — | — | — |
| 3 | 0 | −100 | −200 | — | — | — | — | — |
| 4 | 0 | −50 | −100 | −150 | — | — | — | — |
| 5 | 0 | −175 | −25 | −50 | −75 | — | — | — |
| 6 | 0 | −200 | −25 | −150 | −175 | −125 | — | — |
| 7 | 0 | −200 | −150 | −25 | −175 | −75 | −50 | — |
| 8 | 0 | −175 | −150 | −125 | −25 | −100 | −50 | −200 |

The 802.11ac protocol or the 802.11ax protocol is compatible with a design of the CSD value in 802.11n, that is, CSD values corresponding to one to four antennas in the 802.11ac protocol or the 802.11ax protocol are the same as the CSD values corresponding to one to four antennas in 802.11n.

With evolution of standards, current eight-antenna communication cannot meet communication usage in some scenarios. Based on this, this application proposes a CSD-based communication method. A maximum number of antennas supported in this method is greater than 8, and cyclic shift is performed on a first preamble part of each antenna by using a cyclic shift value, so that an AGC error is reduced in a scenario in which transmission using more antennas (for example, 16 antennas) is supported.

Figure 4:
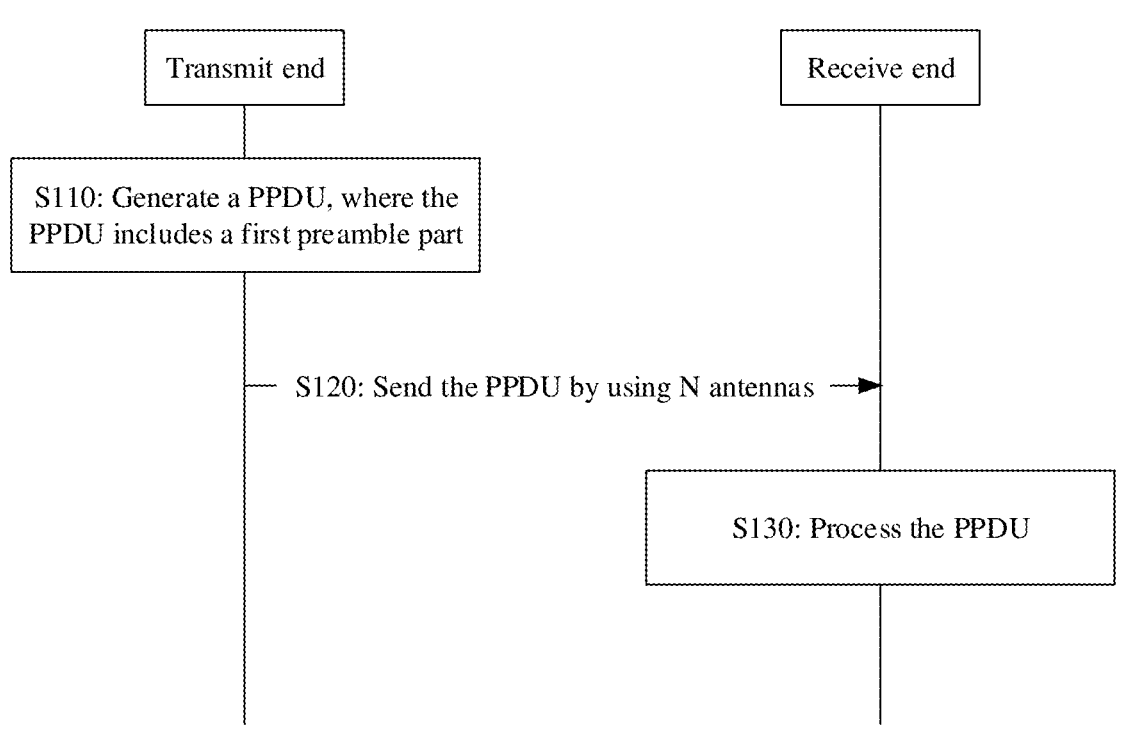
FIG. 4 is a schematic flowchart of a cyclic shift diversity-based communication method according to at least one embodiment.
Figure 5:
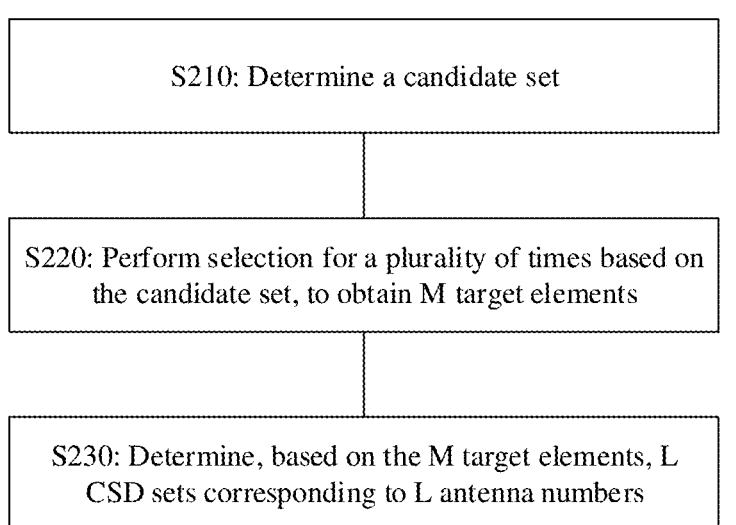
FIG. 5 is a schematic flowchart of a method for determining a cyclic shift diversity value according to at least one embodiment.

The following describes at least one embodiment in detail with reference to FIG. 4 and FIG. 5.

The method in at least one embodiment is applied to a first communication system, the first communication system supports a first communication protocol, and the first communication protocol is the 802.11be protocol or a next-generation protocol of 802.11be.

A maximum number of antennas supported by the first communication protocol is M, and M is a positive integer greater than 8. For example, in response to the first communication protocol being the 802.11be protocol, a maximum number of antennas supported by the 802.11be protocol is 16.

The first communication system in at least one embodiment includes a transmit end and a receive end. FIG. 1 is used as an example. For uplink transmission, a STA is used as the transmit end, and an AP is used as the receive end. For downlink transmission, the AP is used as the transmit end, and the STA is used as the receive end. For another transmission scenario, for example, data transmission between APs, one AP is used as the transmit end, and the other AP is used as the receive end. For another example, for uplink transmission between STAs, one STA is used as the transmit end, and the other STA is used as the receive end. For ease of description, the following describes at least one embodiment based on the transmit end and the receive end.

FIG. 4 is a schematic flowchart of a cyclic shift diversity-based communication method 100 according to at least one embodiment.

S110: The transmit end generates a PPDU, where the PPDU includes a first preamble part.

In response to the transmit end supporting more than eight antennas, the first preamble part includes an L-STF, an L-LTF, an L-SIG, and at least one signaling field newly defined in each generation of protocol.

The 802.11be protocol is used as an example. In an example, the PPDU is the EHT MU PPDU shown in FIG. 2, and the first preamble part includes a field in a pre-EHT modulated field. Specifically, the first preamble part includes an L-STF, an L-LTF, an L-SIG, an RL-SIG, a U-SIG, and an EHT-SIG.

The 802.11be protocol is still used as an example. In another example, the PPDU is the EHT TB PPDU shown in FIG. 3, and the first preamble part includes a field in a pre-EHT modulated field. Specifically, the first preamble part includes an L-STF, an L-LTF, an L-SIG, an RL-SIG, and a U-SIG.

In a process of generating the PPDU, cyclic shift is performed on the first preamble part by using a preset CSD value, to obtain a first preamble part obtained after cyclic shift. The preset CSD value is predefined in a protocol.

A number of antennas actually used by the transmit end is N, where N is a positive integer less than or equal to M. Based on the foregoing description, M is a maximum number of antennas supported by a first communication protocol. One antenna corresponds to one CSD value, and N antennas correspond to N CSD values. The N CSD values are different. A first preamble part sent on an $i^{th}$ antenna in the N antennas is obtained by performing, based on a corresponding CSD value, cyclic shift on a first preamble part on which no cyclic shift is performed, where i is a positive integer less than or equal to N, that is, i=1, 2, . . . , N.

For example, M=16, N=9, nine antennas correspond to nine CSD values, and the nine CSD values are different.

For another example, M=16, N=16, 16 antennas correspond to 16 CSD values, and the 16 CSD values are different.

In response to the maximum number of antennas supported in at least one embodiment being M, the transmit end sends the PPDU by using any number of antennas in M antennas based on an actual situation. M CSD sets is predefined in a system. One antenna number corresponds to one CSD set, and a number of CSD values included in one CSD set is the same as a number of antennas.

For example, M=16, there are 16 antennas, including 1 to 16 antennas, and 16 antenna numbers correspond to 16 CSD sets. One antenna corresponds to one CSD set, and the CSD set includes one CSD value. Two antennas correspond to another CSD set, and the CSD set includes two CSD values. By analogy, 16 antennas correspond to still another CSD set, and the CSD set includes 16 CSD values.

S120: The transmit end sends the PPDU by using the N antennas. Correspondingly, the receive device receives the PPDU.

In a process of sending the PPDU by using the N antennas, the transmit end performs, based on a CSD value corresponding to the $i^{th}$ antenna in the N antennas, cyclic shift on the first preamble part sent on the $i^{th}$ antenna.

Correspondingly, in response to receiving the PPDU, the receive end receives the first preamble part of the PPDU based on the CSD value, where the CSD value is a CSD value based on which the transmit end sends the first preamble part. Specifically, the receive end receives the first preamble part on the $i^{th}$ antenna based on the CSD value corresponding to the $i^{th}$ antenna.

In response to receiving the PPDU, the receive end sets an AGC gain on a field other than an L-STF in a first preamble part based on receive power that is of the L-STF and that is received on each antenna. In at least one embodiment, the CSD value acts on the first preamble part, so that a range of a ratio of receive power of the L-STF in the first preamble part sent on each antenna to receive power of the field other than the L-STF in the first preamble part is stable. Therefore, in response to the receive end setting the AGC gain on the field other than the L-STF in the first preamble part based on the receive power of the L-STF, an AGC error is reduced.

S130: The receive end processes the PPDU.

The receive end processes a service based on data carried in the data field of the PPDU. This is not specifically limited in at least one embodiment.

In at least one embodiment, for the receive end, the CSD value has different functions.

In some scenarios, the receive end does not need to know a CSD value used by the transmit end on each antenna. The CSD value is part of an equivalent channel response and is consistently applied to an entire frame. The receive end performs channel estimation on each frame, and obtains a first preamble part before cyclic shift.

In some other scenarios, the receive end needs to know a CSD value used on each antenna.

For example, in response to operating in a transmit-end beamforming mode, the receive end needs to cancel the CSD before channel quantization/feedback.

For another example, in response to channel smoothing being performed, the CSD value needs to be removed to restore a frequency-domain correlation.

According to the CSD-based communication method provided in at least one embodiment, the maximum number of antennas supported in this method is greater than 8, and cyclic shift is performed on the first preamble part of each antenna by using the CSD value, so that the AGC error is reduced in a scenario in which transmission using more antennas (for example, 16 antennas) is supported.

With reference to FIG. 4, the foregoing describes a procedure of the CSD-based communication method 100 in at least one embodiment. The following describes in detail the CSD value provided in at least one embodiment.

In some embodiments, M=16.

In other words, a maximum number of antennas supported by the transmit end is 16, and a first communication protocol is the 802.11 be protocol.

In an embodiment in which M=16, the following CSD sets are provided.

An example in which N represents a number of transmit antennas and different values of N correspond to different CSD sets is still used for description. A value of N is 1, 2, . . . , M.

In some embodiments, a relationship between a value of N and a CSD set is as follows:

N=1, and the CSD set includes one CSD value, and the CSD value is 0;

N=2, and the CSD set includes two CSD values: 0 and −175 ns;

N=3, and the CSD set includes three CSD values: 0, −175 ns, and −87.5 ns;

N=4, and the CSD set includes four CSD values: 0, −175 ns, −87.5 ns, and −62.5 ns;

N=5, and the CSD set includes five CSD values: 0, −175 ns, −87.5 ns, −62.5 ns, and −200 ns;

N=6, and the CSD set includes six CSD values: 0, −87.5 ns, −200 ns, −187.5 ns, −125 ns, and −12.5 ns;

N=7, and the CSD set includes seven CSD values: 0, −87.5 ns, −62.5 ns, −200 ns, −187.5 ns, −100 ns, and −150 ns;

N=8, and the CSD set includes eight CSD values: 0, −200 ns, −187.5 ns, −100 ns, −50 ns, −25 ns, −125 ns, and −150 ns;

N=9, and the CSD set includes nine CSD values: 0, −175 ns, −87.5 ns, −200 ns, −187.5 ns, −100 ns, −50 ns, −12.5 ns, and −25 ns;

N=10, and the CSD set includes 10 CSD values: 0, −175 ns, −200 ns, −187.5 ns, −100 ns, −50 ns, −12.5 ns, −25 ns, −137.5 ns, and −162.5 ns;

N=11, and the CSD set includes 11 CSD values: 0, −87.5 ns, −200 ns, −187.5 ns, −100 ns, −50 ns, −12.5 ns, −25 ns, −37.5 ns, −137.5 ns, and −150 ns;

N=12, and the CSD set includes 12 CSD values: 0, −175 ns, −87.5 ns, −200 ns, −187.5 ns, −100 ns, −12.5 ns, −25 ns, −37.5 ns, −75 ns, −150 ns, and −162.5 ns;

N=13, and the CSD set includes 13 CSD values: 0, −175 ns, −62.5 ns, −187.5 ns, −100 ns, −50 ns, −12.5 ns, −25 ns, −37.5 ns, −75 ns, −150 ns, −162.5 ns, and −125 ns;

N=14, and the CSD set includes 14 CSD values: 0, −175 ns, −87.5 ns, −187.5 ns, −100 ns, −50 ns, −12.5 ns, −25 ns, −37.5 ns, −75 ns, −150 ns, −125 ns, −162.5 ns, and −137.5 ns;

N=15, and the CSD set includes 15 CSD values: 0, −175 ns, −87.5 ns, −200 ns, −187.5 ns, −100 ns, −50 ns, −12.5 ns, −25 ns, −75 ns, −125 ns, −162.5 ns, −137.5 ns, −112.5 ns, and −150 ns; or N=15, and the CSD set includes 16 CSD values: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

The CSD set corresponding to the antenna number N is predefined in a protocol, and is pre-stored in a device. In response to a PPDU being sent, cyclic shift is performed on a first preamble part by using a corresponding CSD value based on a number of actually used antennas.

For example, a CSD value corresponding to an $i^{th}$ antenna in N antennas is an $i^{th}$ CSD value in a corresponding CSD set, and the transmit end performs cyclic shift on the first preamble part based on the $i^{th}$ CSD, and sends a processed first preamble part by using the $i^{th}$ antenna.

In at least one embodiment, only N CSD values in the CSD set corresponding to the N antennas are shown, and a sequence of the N CSD values in the CSD set changes and is not fixed.

N=16 is used as an example. In an example, a sequence of the 16 CSD values in the CSD set is: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

N=16 is still used as an example. In another example, a sequence of the 16 CSD values in the CSD set is also: −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, −112.5 ns, and 0.

Overall, N=16 is used as an example. N=16, and the CSD set includes 16 CSD values: −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns. A specific sequence is not fixed, and various combinations is included.

Table 3 is a CSD set corresponding to each of 1 to 16 antennas provided in at least one embodiment. In Table 3, cells not filled with data indicate that there is no corresponding CSD value.

N=16 is used an example. A CSD value corresponding to a $1^{st}$ antenna is 0, no cyclic shift is performed, a CSD value corresponding to a $2^{nd}$ antenna is −175 ns, a CSD value corresponding to a $3^{rd}$ antenna is −87.5 ns, . . . , and a CSD value corresponding to a $16^{th}$ antenna is −112.5 ns.

TABLE 3

| Number of transmit antennas (N) | CSD value on an antenna i (ns) | | | | | | | |
| --- | --- | --- | --- | --- | --- | --- | --- | --- |
| | 1 | 2 | 3 | 4 | 5 | 6 | 7 | 8 |
| 1 | 0 | 0 | 0 | 0 | 0 | 0 | 0 | 0 |
| 2 | 0 | −175 | 0 | 0 | 0 | 0 | 0 | 0 |
| 3 | 0 | −175 | −87.5 | 0 | 0 | 0 | 0 | 0 |
| 4 | 0 | −175 | −87.5 | −62.5 | 0 | 0 | 0 | 0 |
| 5 | 0 | −175 | −87.5 | −62.5 | −200 | 0 | 0 | 0 |
| 6 | 0 | −87.5 | −200 | −187.5 | −125 | −12.5 | 0 | 0 |
| 7 | 0 | −87.5 | −62.5 | −200 | −187.5 | −100 | −150 | 0 |
| 8 | 0 | −200 | −187.5 | −100 | −50 | −25 | −125 | −150 |
| 9 | 0 | −175 | −87.5 | −200 | −187.5 | −100 | −50 | −12.5 |
| 10 | 0 | −175 | −200 | −187.5 | −100 | −50 | −12.5 | −25 |

TABLE 3-continued

| | | | | | | | | |
|---|---|---|---|---|---|---|---|---|
| 11 | 0 | −87.5 | −200 | −187.5 | −100 | −50 | −12.5 | −25 |
| 12 | 0 | −175 | −87.5 | −200 | −187.5 | −100 | −12.5 | −25 |
| 13 | 0 | −175 | −62.5 | −187.5 | −100 | −50 | −12.5 | −25 |
| 14 | 0 | −175 | −87.5 | −187.5 | −100 | −50 | −12.5 | −25 |
| 15 | 0 | −175 | −87.5 | −200 | −187.5 | −100 | −50 | −12.5 |
| 16 | 0 | −175 | −87.5 | −200 | −187.5 | −100 | −50 | −12.5 |

| Number of transmit antennas (N) | CSD value on an antenna i (ns) | | | | | | | |
|---|---|---|---|---|---|---|---|---|
| | 9 | 10 | 11 | 12 | 13 | 14 | 15 | 16 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 0 | 0 | 0 | 0 | 0 | 0 |
| 4 | 0 | 0 | 0 | 0 | 0 | 0 | 0 | 0 |
| 5 | 0 | 0 | 0 | 0 | 0 | 0 | 0 | 0 |
| 6 | 0 | 0 | 0 | 0 | 0 | 0 | 0 | 0 |
| 7 | 0 | 0 | 0 | 0 | 0 | 0 | 0 | 0 |
| 8 | 0 | 0 | 0 | 0 | 0 | 0 | 0 | 0 |
| 9 | −25 | 0 | 0 | 0 | 0 | 0 | 0 | 0 |
| 10 | −137.5 | −162.5 | 0 | 0 | 0 | 0 | 0 | 0 |
| 11 | −37.5 | −137.5 | −150 | 0 | 0 | 0 | 0 | 0 |
| 12 | −37.5 | −75 | −150 | −162.5 | 0 | 0 | 0 | 0 |
| 13 | −37.5 | −75 | −150 | −162.5 | −125 | 0 | 0 | 0 |
| 14 | −37.5 | −75 | −150 | −125 | −162.5 | −137.5 | 0 | 0 |
| 15 | −25 | −75 | −125 | −162.5 | −137.5 | −112.5 | −150 | 0 |
| 16 | −25 | −37.5 | −75 | −150 | −125 | −162.5 | −137.5 | −112.5 |

In response to performing AGC setting, the receive end sets an AGC gain on a field other than an L-STF in a first preamble part based on receive power that is of the L-STF and that is received on each antenna. In at least one embodiment, the CSD value acts on the first preamble part to reduce an AGC error. Therefore, whether a design of the CSD value is proper is checked by measuring a range of a ratio of the receive power of the L-SFT to receive power of the field other than the L-STF in the first preamble part. Theoretically, a smaller range of the ratio of the receive power of the L-SFT to the receive power of the field other than the L-STF in the first preamble part indicates a smaller AGC error and a more proper design of the CSD value.

Generally, the range of the ratio of the receive power of the L-STF to the receive power of the another field in the first preamble part is positively correlated with a range of a ratio of the receive power of the L-STF to receive power of the EHT-STF. To be specific, in response to the range of the ratio of the receive power of the L-STF to the receive power of the EHT-STF being small, the range of the ratio of the receive power of the L-STF to the receive power of the another field in the first preamble part is also small.

Therefore, based on the foregoing considerations, in at least one embodiment, whether the design of the CSD value is proper is checked by measuring the range of the ratio of the receive power of the L-STF to the receive power of the EHT-STF.

Definitely, in an actual design, the range of the ratio of the receive power of the L-STF to the receive power of the another field in the first preamble part is also measured first, and in response to the value being small and effect of the CSD value cannot be determined, the range of the ratio of the receive power of the L-STF to the receive power of the EHT-STF is measured, to check properness of the design of the CSD value. The two methods of checking the CSD value is used flexibly.

Table 4 lists ranges of ratios of the receive power of the L-STF to the receive power of the EHT-STF in a plurality of scenarios. A 20 MHz bandwidth and a 40 MHz bandwidth are listed. Four channel models are listed, which are repre-sented by B, C, D, and E. The four channel models are defined in 802.11. Parameters of the channel models are different. 1 to 16 antennas are listed. Angles of 0 degrees and 180 degrees (represented by pi) are listed for an initial phase difference between odd and even antennas.

A scenario is represented by a number of antennas, an initial phase difference between odd and even antennas, a bandwidth, and a channel model. Number of antennas-initial phase difference between odd and even antennas represents a combination of the number of antennas and the initial phase difference between odd and even antennas, and a bandwidth-channel model represents a combination of the bandwidth and the channel model. For example, in response to the number of antennas being 2 and the initial phase difference between odd and even antennas is pi, 2–pi is used for representing. In response to the bandwidth being 20M and the channel model is the model B, 20M-B is used for representing.

A value in one cell indicates a range of a ratio of the receive power of the L-STF to the receive power of the EHT-STF in one scenario.

For example, a value in row 3 and column 1 in a value area is 15.49. The value indicates that the range of the ratio of the receive power of the L-STF to the receive power of the EHT-STF is 15.49 in a scenario in which the number of antennas is 2, the initial phase difference between the odd and even antennas is 0, the bandwidth is 20M, and the channel model is the model B.

For another example, a value in row 4 and column 1 in a value area is 15.35 (a word in black in the table). The value indicates that the range of the ratio of the receive power of the L-STF to the receive power of the EHT-STF is 15.35 in a scenario in which the number of antennas is 2, the initial phase difference between the odd and even antennas is pi, the bandwidth is 20M, and the channel model is the model B. From Table 4, based on the CSD sets with different antenna numbers provided in at least one embodiment, in response to the CSD set acting on the first preamble part, the range of the ratio of the receive power of the L-STF to the receive power of the EHT-STF is small, which also means that the range of the ratio of the receive power of the L-STF to the receive power of the field other than the L-STF in the first preamble part is also small. Therefore, the AGC error is small.

TABLE 4

| Number of antennas-initial phase difference between odd and even antennas | Range of a ratio of receive power of the L-STF to receive power of the EHT-STF Bandwidth-channel model | | | | | | | |
|---|---|---|---|---|---|---|---|---|
| (degree) | 20M-B | 20M-C | 20M-D | 20M-E | 40M-B | 40M-C | 40M-D | 40M-E |
| 1-0 | 19.11 | 16.49 | 13.93 | 11.09 | 14.86 | 12.88 | 10.33 | 8.5 |
| 1-pi | 19.11 | 16.49 | 13.93 | 11.09 | 14.86 | 12.88 | 10.33 | 8.5 |
| 2-0 | 15.49 | 15.41 | 12.65 | 8.77 | 12.34 | 11.84 | 9.65 | 7.03 |
| 2-pi | 15.35 | 15.02 | 11.73 | 9.86 | 12.54 | 12.1 | 9.58 | 7.04 |
| 3-0 | 14.21 | 14.59 | 12.41 | 8.63 | 11.58 | 11.69 | 9.23 | 6.81 |
| 3-pi | 12.57 | 14.38 | 11.71 | 9.55 | 11.19 | 11.74 | 9.44 | 6.89 |
| 4-0 | 14.11 | 13.39 | 12.33 | 9.11 | 11.67 | 11.06 | 9.3 | 6.38 |
| 4-pi | 14.29 | 14.27 | 13.1 | 9.56 | 11.49 | 11.43 | 9.1 | 6.86 |
| 5-0 | 13.79 | 12.24 | 12.77 | 9.16 | 11.52 | 10.98 | 9.63 | 5.81 |
| 5-pi | 13.04 | 14.34 | 11.58 | 8.81 | 10.69 | 11.22 | 8.46 | 6.28 |
| 6-0 | 14.92 | 13.98 | 11.29 | 8.98 | 9.64 | 10.25 | 7.73 | 6.79 |
| 6-pi | 11.99 | 14.97 | 11.98 | 10.1 | 11.41 | 11.25 | 8.48 | 6.72 |
| 7-0 | 11.95 | 12.96 | 11.34 | 8.37 | 11.73 | 11.87 | 7.06 | 6.58 |
| 7-pi | 14.22 | 15.2 | 11.46 | 6.79 | 11.82 | 10.19 | 9.02 | 7.11 |
| 8-0 | 12.55 | 11.78 | 11.9 | 8.36 | 11.6 | 12.9 | 8.36 | 6.43 |
| 8-pi | 13.54 | 13.87 | 11.15 | 9.04 | 9.8 | 10.2 | 7.96 | 6.96 |
| 9-0 | 13.17 | 11.7 | 11.71 | 9.8 | 9.57 | 10.34 | 9.77 | 5.88 |
| 9-pi | 14.03 | 14.65 | 12 | 9.29 | 11.03 | 11.35 | 7.89 | 6.88 |
| 10-0 | 14.19 | 12.78 | 11.76 | 10.18 | 10.84 | 11.45 | 8.17 | 6.64 |
| 10-pi | 14.37 | 13.8 | 11.58 | 9.22 | 10.49 | 11.74 | 8.36 | 5.74 |
| 11-0 | 12.59 | 12.1 | 10.12 | 9.19 | 8.38 | 10.09 | 9.26 | 6.17 |
| 11-pi | 13.4 | 14.31 | 9.79 | 9.31 | 10.49 | 11.25 | 7.41 | 7.13 |
| 12-0 | 12.17 | 11.63 | 12.5 | 8.78 | 9.85 | 10.17 | 9.33 | 6.46 |
| 12-pi | 13.88 | 14.13 | 9.89 | 9.38 | 9.49 | 11.45 | 6.77 | 6.5 |
| 13-0 | 10.91 | 12.76 | 11.67 | 9.98 | 9.83 | 10.04 | 8.59 | 6.49 |
| 13-pi | 13.82 | 14.01 | 11.08 | 9.41 | 10.74 | 11.84 | 7.55 | 6.86 |
| 14-0 | 13.28 | 13.52 | 11.5 | 9.31 | 10 | 11.7 | 8.3 | 7.17 |
| 14-pi | 13.81 | 14.06 | 11.38 | 9.52 | 9.93 | 12.01 | 7.6 | 6.92 |
| 15-0 | 12.95 | 9.55 | 11.19 | 9.45 | 9.68 | 10.85 | 9.53 | 7.18 |
| 15-pi | 12.93 | 13.99 | 10.3 | 9.29 | 9 | 11.55 | 8.23 | 7.09 |
| 16-0 | 11.57 | 12.61 | 12.97 | 9.84 | 9.69 | 10.35 | 9.37 | 6.02 |
| 16-pi | 13.9 | 14.58 | 11 | 8.37 | 8.73 | 11.38 | 7.22 | 6.71 |

According to the CSD-based communication method provided in at least one embodiment, in response to the maximum number of antennas supported in the method being 16, a CSD set corresponding to each of 1 to 16 antennas is provided. The CSD set acts on the first preamble part, so that the AGC error is better reduced in a scenario in which transmission using 16 antennas is supported.

In some other embodiments, a relationship between a value of N and a CSD set is as follows:

N=9, and the CSD set includes nine CSD values: 0, −175 ns, −87.5 ns, −62.5 ns, −200 ns, −187.5 ns, −100 ns, −50 ns, and −12.5 ns;

N=10, and the CSD set includes 10 CSD values: 0, −175 ns, −87.5 ns, −62.5 ns, −200 ns, −187.5 ns, −100 ns, −50 ns, −12.5 ns, and −25 ns;

N=11, and the CSD set includes 11 CSD values: 0, −175 ns, −87.5 ns, −200 ns, −187.5 ns, −100 ns, −50 ns, −12.5 ns, −25 ns, −37.5 ns, and −125 ns;

N=12, and the CSD set includes 12 CSD values: 0, −175 ns, −200 ns, −187.5 ns, −100 ns, −50 ns, −12.5 ns, −25 ns, −37.5 ns, −75 ns, −162.5 ns, and −112.5 ns;

N=13, and the CSD set includes 13 CSD values: 0, −87.5 ns, −200 ns, −187.5 ns, −100 ns, −50 ns, −12.5 ns, −25 ns, −37.5 ns, −75 ns, −162.5 ns, −125 ns, and −137.5 ns;

N=14, and the CSD set includes 14 CSD values: 0, −175 ns, −62.5 ns, −200 ns, −187.5 ns, −100 ns, −50 ns, −12.5 ns, −25 ns, −37.5 ns, −75 ns, −150 ns, −112.5 ns, and −162.5 ns;

N=15, and the CSD set includes 15 CSD values: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, and −137.5 ns; or N=15, and the CSD set includes 16 CSD values: 0, −175 ns, −62.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

The CSD set corresponding to the antenna number N is predefined in a protocol, and is pre-stored in a device. In response to a PPDU being sent, cyclic shift is performed on a first preamble part by using a corresponding CSD set based on a number of actually used antennas.

For example, a CSD value corresponding to an $i^{th}$ antenna in N antennas is an $i^{th}$ CSD value in a corresponding CSD set, and the transmit end performs cyclic shift on the first preamble part based on the $i^{th}$ CSD, and sends a processed first preamble part by using the $i^{th}$ antenna.

In at least one embodiment, only N CSD values in the CSD set corresponding to the N antennas are shown, and a sequence of the N CSD values in the CSD set changes and is not fixed.

N=9 is used as an example. In an example, a sequence of the nine CSD values in the CSD set is: 0, −175 ns, −87.5 ns, −62.5 ns, −200 ns, −187.5 ns, −100 ns, −50 ns, and −12.5 ns.

N=9 is still used as an example. In another example, a sequence of the 9 CSD values in the CSD set is also: −175 ns, −87.5 ns, −62.5 ns, −200 ns, −187.5 ns, −100 ns, −50 ns, −12.5 ns, and 0.

Overall, N=9 is used as an example. N=9, and the CSD set includes 16 CSD values: −175 ns, −87.5 ns, −62.5 ns, −200 ns, −187.5 ns, −100 ns, −50 ns, and −12.5 ns. A specific sequence is not fixed, and various combinations is included.

Table 5 is a CSD set corresponding to each of 9 to 16 antennas provided in at least one embodiment. In Table 5, cells not filled with data indicate that there is no corresponding CSD value.

N=9 is used an example. A CSD value corresponding to a $1^{st}$ antenna is 0, no cyclic shift is performed, a CSD value corresponding to a $2^{nd}$ antenna is −175 ns, a CSD value corresponding to a $3^{rd}$ antenna is −87.5 ns, . . . , and a CSD value corresponding to a $9^{th}$ antenna is −12.5 ns.

TABLE 5

| Send Number of transmit antennas (N) | CSD value on an antenna i (ns) | | | | | | | |
|---|---|---|---|---|---|---|---|---|
| | 1 | 2 | 3 | 4 | 5 | 6 | 7 | 8 |
| 9 | 0 | −175 | −87.5 | 62.5 | −200 | −187.5 | −100 | −50 |
| 10 | 0 | −175 | −87.5 | −62.5 | −200 | −187.5 | −100 | −50 |
| 11 | 0 | −175 | −87.5 | −200 | −187.5 | −100 | −50 | −12.5 |
| 12 | 0 | −175 | −200 | −187.5 | −100 | −50 | −12.5 | −25 |
| 13 | 0 | −87.5 | −200 | −187.5 | −100 | −50 | −12.5 | −25 |
| 14 | 0 | −175 | −62.5 | −200 | −187.5 | −100 | −50 | −12.5 |
| 15 | 0 | −175 | −87.5 | −200 | −187.5 | −100 | −50 | −12.5 |
| 16 | 0 | −175 | −62.5 | −200 | −187.5 | −100 | −50 | −12.5 |

| Send Number of transmit antennas (N) | CSD value on an antenna i (ns) | | | | | | | |
|---|---|---|---|---|---|---|---|---|
| | 9 | 10 | 11 | 12 | 13 | 14 | 15 | 16 |
| 9 | −12.5 | 0 | 0 | 0 | 0 | 0 | 0 | 0 |
| 10 | −12.5 | −25 | 0 | 0 | 0 | 0 | 0 | 0 |
| 11 | −25 | −37.5 | −125 | 0 | 0 | 0 | 0 | 0 |
| 12 | −37.5 | −75 | −162.5 | −112.5 | 0 | 0 | 0 | 0 |
| 13 | −37.5 | −75 | −162.5 | −125 | −137.5 | 0 | 0 | 0 |
| 14 | −25 | −37.5 | −75 | −150 | −112.5 | −162.5 | 0 | 0 |
| 15 | −25 | −37.5 | −75 | −150 | −125 | −162.5 | −137.5 | 0 |
| 16 | −25 | −37.5 | −75 | −150 | −125 | −162.5 | −137.5 | −112.5 |

In at least one embodiment, in response to the number of antennas being 1 to 8, a CSD set in an earlier communication protocol is used. For example, the earlier communication protocol is the 802.11n protocol, the 802.11ac protocol, or the 802.11ax protocol. CSD sets corresponding to one to four antennas are CSD sets corresponding to one to four antennas in the 802.11n protocol (as shown in Table 1), and CSD sets corresponding to one to eight antennas are CSD sets corresponding to one to eight antennas in the 802.11ac protocol or the 802.11ax protocol (as shown in Table 2).

That is, in response to the CSD sets corresponding to one to eight antennas being the CSD sets of the earlier communication protocol, so that the earlier communication protocol is compatible, thereby facilitating smooth evolution of a system.

Table 6 lists ranges of ratios of the receive power of the L-STF to the receive power of the EHT-STF in a plurality of scenarios. For related descriptions, refer to descriptions in Table 4. Details are not described herein.

From Table 6, based on the CSD sets with different antenna numbers provided in at least one embodiment, in response to the CSD set acting on the first preamble part, the range of the ratio of the receive power of the L-STF to the receive power of the EHT-STF is small, which also means that the range of the ratio of the receive power of the L-STF to the receive power of the field other than the L-STF in the first preamble part is also small. Therefore, the AGC error is small

TABLE 6

| Number of antennas-initial phase difference between odd and even antennas | Range of a ratio of receive power of the L-STF to receive power of the EHT-STF Bandwidth-channel model | | | | | | | |
|---|---|---|---|---|---|---|---|---|
| | 20M-B | 20M-C | 20M-D | 20M-E | 40M-B | 40M-C | 40M-D | 40M-E |
| 9-0 | 2.86 | 3.46 | 3.69 | 4.02 | 1.55 | 1.93 | 1.88 | 2.52 |
| 9-pi | 2.84 | 3.52 | 3.44 | 3.88 | 2.39 | 2.91 | 2.28 | 2.64 |
| 10-0 | 2.64 | 3.14 | 3.38 | 3.96 | 1.51 | 2.03 | 2.01 | 2.6 |

TABLE 6-continued

| Number of antennas-initial phase difference between odd and even antennas | Range of a ratio of receive power of the L-STF to receive power of the EHT-STF Bandwidth-channel model | | | | | | | |
|---|---|---|---|---|---|---|---|---|
|  | 20M-B | 20M-C | 20M-D | 20M-E | 40M-B | 40M-C | 40M-D | 40M-E |
| 10-pi | 3.3 | 4.15 | 3.35 | 3.91 | 2.21 | 3.06 | 2.16 | 2.68 |
| 11-0 | 2.8 | 3.28 | 3.62 | 3.88 | 1.77 | 2.36 | 2.17 | 2.68 |
| 11-pi | 3.27 | 4.09 | 3.23 | 4.17 | 2.33 | 2.91 | 2.34 | 2.69 |
| 12-0 | 3.37 | 3.52 | 3.84 | 3.77 | 2 | 2.22 | 2.27 | 2.45 |
| 12-pi | 3.14 | 3.89 | 3.59 | 3.95 | 2.61 | 2.98 | 2.34 | 2.75 |
| 13-0 | 3.47 | 3.91 | 3.66 | 3.85 | 2.17 | 2.51 | 2.35 | 2.59 |
| 13-pi | 3.82 | 4.14 | 3.39 | 4.12 | 2.49 | 2.81 | 2.54 | 2.83 |
| 14-0 | 3.51 | 4.18 | 3.82 | 3.88 | 2.33 | 2.38 | 2.62 | 2.95 |
| 14-pi | 3.27 | 3.95 | 4.13 | 4.07 | 2.91 | 2.92 | 2.46 | 2.81 |
| 15-0 | 3.56 | 3.79 | 3.8 | 4.17 | 2.27 | 2.25 | 2.55 | 2.71 |
| 15-pi | 3.31 | 3.97 | 3.91 | 3.91 | 2.65 | 3.3 | 2.49 | 3.07 |
| 16-0 | 3.65 | 4.08 | 3.94 | 3.96 | 2.42 | 2.19 | 2.71 | 2.89 |
| 16-pi | 3.44 | 3.88 | 4.08 | 3.93 | 3.04 | 2.71 | 2.46 | 2.93 |

According to the CSD-based communication method provided in at least one embodiment, in response to the maximum number of antennas supported in the method being 16, a CSD set corresponding to each of 9 to 16 antennas is provided. The CSD set acts on the first preamble part, so that an AGC error is better reduced in a scenario in which transmission using 16 antennas is supported. In addition, in response to the maximum number of antennas supported in the method being 16 and a number of used antennas being 1 to 8, CSD sets corresponding to one to eight antennas in an earlier communication protocol (for example, the 802.11n protocol, the 802.11ac protocol, or the 802.11ax protocol) is used, so that the earlier communication protocol is compatible, thereby facilitating smooth evolution of a system.

the unit ns of the CSD value provided in at least one embodiment is merely an example for description. In some other embodiments, the unit of the CSD value is another time unit, for example, microsecond (microsecond, µs). This is not specifically limited in this application.

In response to the unit of the CSD value being the another time unit, unit conversion needs to be performed. For example, in response to the another time unit being microsecond (microsecond, µs), the CSD value changes from −175 ns to −0.175 µs.

The foregoing describes the CSD set provided in at least one embodiment. The following provides a method for determining the CSD set. The CSD set corresponding to the antenna number N is determined according to the method. Certainly, the CSD set corresponding to the 16 antennas provided in at least one embodiment is also determined by using another method. This is not specifically limited in at least one embodiment.

FIG. 5 shows a method 200 for determining a CSD set according to at least one embodiment. The method is executed by any apparatus having a data processing capability.

S210: Determine a candidate set.

The candidate set includes X elements, and each element is considered as a candidate CSD value.

In some embodiments, a range of the candidate set is determined based on factors such as a period of an L-STF, a precision specification for start of packet detection, and an acceptable AGC error.

In some embodiments, time intervals between any two adjacent elements in the candidate set are equal.

In an example, a quotient of duration of the range of the candidate set divided by the time interval is a number of elements included in the candidate set. In view of this, all elements in the candidate set are multiples of the time interval.

For example, the range of the candidate set is assumed to be [0, −200], and in response to the time interval being −12.5, the candidate set is [0 −12.5 −25 −37.5 −50 −62.5 −75 −87.5 −100 −112.5 −125 −137.5 −150 −162.5 −175 −187.5 −200], where X=17.

The time interval alternatively is another value, for example, −6.25 ns or −25 ns. This is not limited in at least one embodiment.

S220: Perform selection for a plurality of times based on the candidate set, to obtain M target elements.

As described above, M is the maximum number of antennas that is supported by the system.

In this step, limited M target elements is preliminarily selected from a plurality of elements in the candidate set. The M target elements include all values of CSD sets corresponding to each of different antenna numbers. Subsequently, in S230, the CSD set corresponding to each antenna number is further determined from the M target elements.

In some embodiments, selection is performed on the candidate set for a plurality of times based on a first criterion value, to obtain the M target elements.

In at least one embodiment, the first criterion value is related to a range of a ratio of receive power of an L-STF in a first preamble part to receive power of a field other than the L-STF in the first preamble part.

An objective of designing the CSD value is to make the range of the ratio of the receive power of the L-STF in the first preamble part to the receive power of the field other than the L-STF in the first preamble part is minimized Therefore, in response to the CSD value being designed, the range of the ratio of the receive power of the L-STF in the first preamble part to the receive power of the field other than the L-STF in the first preamble part is used as a design criterion.

In an example, the first criterion value is a range of a ratio that is of the receive power of the L-STF to the receive power of the field other than the L-STF in the first preamble part and that is obtained in any one of the following plurality of scenarios.

In another example, the first criterion value is a maximum value that is in ranges of ratios of the receive power of the L-STF to the receive power of the another field in the first preamble part and that is obtained in at least two of the following plurality of scenarios.

For example, the plurality of scenarios includes the following scenarios:

Scenario 1: In a 20 MHz bandwidth, an initial phase difference between odd and even transmit antennas is 0 degrees by using a channel model B.

Scenario 2: In a 20 MHz bandwidth, an initial phase difference between odd and even antennas is 180 degrees by using a channel model B.

Scenario 3: In a 20 MHz bandwidth, an initial phase difference between odd and even transmit antennas is 0 degrees by using a channel model C.

Scenario 4: In a 20 MHz bandwidth, an initial phase difference between odd and even antennas is 180 degrees by using a channel model C.

Scenario 5: In a 20 MHz bandwidth, an initial phase difference between odd and even transmit antennas is 0 degrees by using a channel model D.

Scenario 6: In a 20 MHz bandwidth, an initial phase difference between odd and even antennas is 180 degrees by using a channel model D.

Scenario 7: In a 20 MHz bandwidth, an initial phase difference between odd and even transmit antennas is 0 degrees by using a channel model E.

Scenario 8: In a 20 MHz bandwidth, an initial phase difference between odd and even antennas is 180 degrees by using a channel model E.

The eight scenarios in the foregoing examples are merely examples for description, and first criterion values in more scenarios is calculated based on an actual situation.

The range of the ratio of the receive power of the L-STF to the receive power of the field other than the L-STF in the first preamble part represents a distribution range of a ratio of an average power of sample points of the L-STF to an average power of sample points of the another field, where the average power of the sample points of the L-STF represents an average power of sample points in response to the L-STF being cyclic shifted, passes through a channel, and reaches a receive antenna of a receive end, and the average power of the sample points of the another field represents an average power of sample points in response to the another field being cyclic shifted, passes through a channel, and reaches a receive antenna of a receive end.

The range of the ratio of the receive power of the L-STF to the receive power of the field other than the L-STF in the first preamble part is represented by using the following formula:

$$E_{AGC} = 10\log_{10}\left(\frac{\text{mean}(|X_i|^2)}{\text{mean}(|Y_{1i}|^2)}\right)$$

$E_{AGC}$ represents a power ratio, $X_i$ represents signal sampling of the L-STF, $Y_{1i}$ represents signal sampling of the field other than the L-STF in the first preamble part, i is a sampling sequence number, and mean represents an average value function of a plurality of sampling points. A calculation manner of the range of the ratio of the receive power of the L-STF to the receive power of the another field is understood as: counting an interval difference between power ratios of a probability result between 2.5% and 97.5% in a cumulative distribution function (cumulative distribution function, CDF) of the power ratio $E_{AGC}$. A smaller interval difference indicates more centralized power distribution and better CSD performance.

In at least one embodiment, the first criterion value is related to a range of a ratio of receive power of an L-STF of a PPDU to receive power of an EHT-STF of the PPDU.

An objective of designing the CSD value is to make the range of the ratio of the receive power of the L-STF in the first preamble part to the receive power of the field other than the L-STF in the first preamble part is minimized. However, in some cases, the range of the ratio of the receive power of the L-STF to the receive power of the field other than the L-STF in the first preamble part is usually small, and is not easy to indicate a feature of the CSD value, while the range of the ratio of the receive power of the L-STF to the receive power of the EHT-STF is used to indicate a feature of the CSD value. Therefore, in at least one embodiment, the range of the ratio of the receive power of the L-STF to the receive power of the EHT-STF is used as a criterion for designing the CSD value.

Generally, the range of the ratio of the receive power of the L-STF to the receive power of the another field in the first preamble part is in direct proportion to the range of the ratio of the receive power of the L-STF to the receive power of the EHT-STF. To be specific, in response to the range of the ratio of the receive power of the L-STF to the receive power of the EHT-STF being small, the range of the ratio of the receive power of the L-STF to the receive power of the another field in the first preamble part is also small. In at least one embodiment, in response to effect of the CSD value in the CSD set being tested after the CSD set corresponding to each of the different antenna numbers is determined, the range of the ratio of the receive power of the L-STF to the receive power of the another field in the first preamble part is first measured. In response to the effect of the CSD value not being able to be determined because of the small value, the range of the ratio of the receive power of the L-STF to the receive power of the EHT-STF is measured, a small range of the ratio of the receive power of the L-STF to the receive power of the EHT-STF indicates a proper design of the CSD value.

In an example, the first criterion value is a range of a ratio that is of the receive power of the L-STF to the receive power of the EHT-STF and that is obtained in any one of a plurality of scenarios.

In another example, the first criterion value is a maximum value that is in ranges of ratios of the receive power of the L-STF of the PPDU to the receive power of the EHT-STF of the PPDU and that is obtained in at least two of the plurality of scenarios.

For descriptions of the plurality of scenarios, refer to the plurality of scenarios described in at least one embodiment. Details are not described again.

The range of the ratio of the receive power of the L-STF to the receive power of the EHT-STF represents a distribution range of a ratio of an average power of sample points of the L-STF to an average power of sample points of the EHT-STF, where the average power of the sample points of the L-STF represents an average power of sample points in response to the L-STF being cyclic shifted, passes through a channel, and reaches a receive antenna of a receive end, and the average power of the sample points of the EHT-STF represents an average power of sample points in response to the EHT-STF being cyclic shifted, passes through a channel, and reaches a receive antenna of a receive end.

The range of the ratio of the receive power of the L-STF to the receive power of the EHT-STF is represented by using the following formula:

$$E_{AGC} = 10\log_{10}\left(\frac{\text{mean}(|X_i|^2)}{\text{mean}(|Y_{1i}|^2)}\right)$$

$E_{AGC}$ represents a power ratio, $X_i$ represents signal sampling of the L-STF, $Y_{2i}$ represents signal sampling of the EHT-STF, i is a sampling sequence number, and mean represents an average value function of a plurality of sampling points. A calculation manner of the range of the ratio of the receive power of the L-STF to the receive power of the EHT-STF is understood as: counting an interval difference between power ratios of a probability result between 2.5% and 97.5% in a CDF of the power ratio $E_{AGC}$. A smaller interval difference indicates more centralized power distribution and better CSD performance.

The following describes a process of determining the M target elements by using an example in which the first criterion value is the maximum value in that is in the ranges of ratios of the receive power of the L-STF of the PPDU to the receive power of the EHT-STF of the PPDU and that is obtained in the foregoing eight scenarios.

For ease of description, the candidate set is denoted as a candidate set A, and the candidate set A=[$a_1$, $a_2$, . . . , $a_X$]. In addition, in at least one embodiment, a selected set B is further defined, and is used to calculate the first criterion value to determine the M target elements.

Because a value of one element in the M target elements is definitely 0, for example, an element in an initial selected set B is set to 0. Subsequently, selection is performed each time, another target element is obtained, and the obtained target element is added to the selected set B. After selection is performed for a plurality of times (M−1 times), in response to a number of target elements in the selected set B reaching M, this step is completed.

A larger number of elements in the initial selected set B indicates a smaller number of times for selecting the target element from the candidate set A. A sum of a number $M_1$ of elements in the initial selected set B and a number $M_2$ of times for selecting is M.

In response to an element of the initial selected set B being defined to be 0, selection is performed for M−1 times to obtain M−1 target elements, where the M−1 target elements and the initial element 0 form the M target elements, and $M_2$=M−1.

During Selection for the First Time:

First, a plurality of elements in the candidate set A are sequentially added to the selected set B, to obtain a plurality of intermediate sets $B_1$, where each intermediate set $B_1$ includes two elements, that is, 0 and one element in the candidate set A.

Second, a first criterion value obtained based on an element in each intermediate set $B_1$ is calculated, and a plurality of first criterion values are obtained. Values of the plurality of first criterion values are compared, and an element in an intermediate set $B_1$ corresponding to a smallest criterion value in the first criterion values is used as a finally obtained target element.

In response to the initial selected set B already including the element 0, and the candidate set A also includes the element 0, the element 0 in the candidate set A does not need to be added to the selected set B.

For example, the candidate set A=[$a_1$, $a_2$, . . . , $a_X$], the candidate set A does not include the element 0, and the initial selected set B=[0]. $a_1$, a2, . . . , and $a_X$ are sequentially added to the selected set B to obtain X intermediate sets $B_1$, where an $x^{th}$ of the X intermediate sets $B_1$ is denoted as $B_{1x}$, x=1, 2, . . . , X, and X intermediate sets $B_1$ are: $B_{11}$=[0 $a_1$], $B_{12}$=[0 $a_2$], . . . , $B_{1X}$=[0 $a_X$]. A first criterion value obtained based on the $x^{th}$ intermediate set $B_{1x}$ is $P_{1x}$, and X first criterion values are obtained based on the X intermediate sets $B_1$: $P_{11}$, $P_{12}$, . . . , $P_{1X}$. Assuming that a value of $P_{11}$ is the smallest, the element $a_1$ corresponding to $P_{11}$ is used as a target element.

Certainly, in response to the candidate set A=[$a_1$, $a_2$, . . . , $a_X$] including the element 0, X −1 intermediate sets $B_1$ are obtained, and X−1 first criterion values are obtained.

After the target element is determined, the target element is deleted from the candidate set A, to obtain a candidate set A obtained after the first update, where the candidate set A obtained after the first update includes X−1 elements. The target element is added to the selected set B, to obtain a selected set B obtained after the first update, that is, a selected set corresponding to the smallest first criterion value is the selected set B obtained after the first update, and the selected set B obtained after the first update includes two target elements.

During Selection for the Second Time:

First, a plurality of elements in a candidate set A obtained after the first update are sequentially added to a selected set B obtained after the first update, to obtain a plurality of intermediate sets $B_2$. Each intermediate set $B_2$ includes three elements, that is, two target elements in the selected set B obtained after the first update and one element in the candidate set A.

Second, a first criterion value obtained based on an element in each intermediate set $B_2$ is calculated, and a plurality of first criterion values are obtained. Values of the plurality of first criterion values are compared, and a smallest value in the first criterion values is used as a finally obtained target element.

Likewise, in an example, X−1 elements in the candidate set A obtained after the first update is sequentially added to the selected set B obtained after the first update, to finally obtain X−1 intermediate sets $B_2$ and obtain X−1 first criterion values.

Next, in the example during selection for the first time, the candidate set A=[$a_2$, . . . , $a_X$] after the first update and the selected set B=[0 $a_2$] after the first update are used as an example, $a_2$, . . . , and $a_X$ are sequentially added to the selected set B after the first update, to obtain X−1 intermediate sets $B_2$, and an $x^{th}$ of the X−1 intermediate sets $B_2$ is denoted as $B_{2x}$, x=1, 2, . . . X−1, and the X−1 intermediate sets $B_2$ are: $B_{21}$=[0 $a_2$], $B_{22}$=[0 $a_3$], . . . , and $B_{2X-1}$=[0 $a_X$]. A first criterion value obtained based on the $x^{th}$ intermediate set $B_{1x}$ is $P_{1x}$, and X−1 first criterion values are obtained based on the X−1 intermediate sets $B_2$: $P_{21}$, $P_{22}$, . . . , $P_{2X-1}$. Assuming that a value of $P_{21}$ is the smallest, the element $a_2$ corresponding to $P_{21}$ is used as another target element.

Certainly, in response to the candidate set A=[$a_2$, . . . , $a_X$] including the element 0, X−2 intermediate sets $B_2$ are obtained, and X−2 first criterion values are obtained.

After the target element selected for the second time is determined, the target element is deleted from the candidate set A updated for the first time, to obtain a candidate set A updated for the second time, where the candidate set A updated for the second time includes X−2 elements. The target element is added to the selected set B updated for the first time, to obtain a selected set B updated for the second time, where the selected set B updated for the second time includes three target elements.

In this way, by analogy, each time a new target element is selected, the target element is deleted from a candidate set A that is updated last time, to obtain a currently updated candidate set A, and the target element is added to a selected set B that is updated last time, to obtain a currently updated selected set B. Finally, the M target elements is obtained after selection is performed for M−1 times.

For example, an initial candidate set A=[0 −12.5 −25 −37.5 −50 −62.5 −75 −87.5 −100 −112.5 −125 −137.5 −150 −162.5 −175 −187.5 −200] and an initial selected set B=[0] are used as an example to describe a process of determining the M target elements.

During Selection for the First Time:

The candidate set A=[0 −12.5 −25−37.5 −50 −62.5 −75 −87.5 −100 −112.5 −125 −137.5 −150 −162.5 −175 −187.5 −200], the selected set B=[0], X=17, and 16 elements other than 0 in the candidate set A are added to the selected set B, to obtain 16 intermediate sets $B_1$.

The 16 intermediate sets $B_1$ are as follows:

a $1^{st}$ intermediate set $B_1$ is [0 −12.5];

a $2^{nd}$ intermediate set $B_1$ is [0 −25];

a $3^{rd}$ intermediate sets $B_1$ is [0 −37.5];

a $4^{th}$ intermediate sets $B_1$ is [0 −50];

a $5^{th}$ intermediate sets $B_1$ is [0 −62.5];

a $6^{th}$ intermediate sets $B_1$ is [0 −75];

a $7^{th}$ intermediate sets $B_1$ is [0 −87.5];

an $8^{th}$ intermediate sets $B_1$ is [0 −100];

a $9^{th}$ intermediate sets $B_1$ is [0 −112.5];

a $10^{th}$ intermediate sets $B_1$ is [0 −125];

an $11^{th}$ intermediate sets $B_1$ is [0 −137.5];

a $12^{th}$ intermediate sets $B_1$ is [0 −150];

a $13^{th}$ intermediate sets $B_1$ is [0 −162.5];

a $14^{th}$ intermediate sets $B_1$ is [0 −175];

a $15^{th}$ intermediate sets $B_1$ is [0 −187.5]; and a $16^{th}$ intermediate sets $B_1$ is [0 −200].

A first criterion value corresponding to each intermediate set $B_1$ is calculated, and an intermediate set $B_1$ whose first criterion value is the smallest is selected from the 16 intermediate sets. In this case, the intermediate set whose first criterion value is the smallest is a selected set after the first update. After calculation, a first criterion value corresponding to the $14^{th}$ intermediate set $B_1$ is the smallest, and therefore a selected set after the first update is [0 −175], and a candidate set A after the first update is A=[0 −12.5 −25 −37.5 −50 −62.5 −75 −87.5 −100 −112.5 −125 −137.5 −150 −162.5 −187.5 −200].

By analogy, the foregoing process is repeated until a number of target elements in the selected set B reaches M.

Finally, after calculation, a finally obtained selected set B=[0 −175 −87.5 −62.5 −200 −187.5 −100 −50 −12.5 −25 −37.5 −75 −150 −125 −162.5 −137.5], which includes the M target elements.

S230: Determine L CSD sets corresponding to L antenna numbers based on the M target elements, where one antenna number corresponds to one CSD set, and L is a positive integer greater than 1 and less than or equal to M−1.

In response to the earlier communication protocol being incompatible, a CSD set corresponding to each antenna number being greater than 1 is determined, where L=M−1.

j antennas in the L antenna numbers are used as an example, and a process of determining a CSD set corresponding to the j antennas is described, where j=2, 3, . . . , L.

1. Determine a Discrete Time Set

A manner of determining the discrete time set is the same as the manner of determining the candidate set in S220, and details are not described again. In addition, the discrete time set is the same as the candidate set.

For example, the discrete time set Q is Q=[0 −12.5 −25 −37.5 −50 −62.5 −75 −87.5 −100 −112.5 −125 −137.5 −150 −162.5 −175 −187.5 −200].

2. Determine a First Initial Set and a Second Initial Set

The first initial set includes j target elements in the M target elements. For example, the j target elements are the first j elements in the M target elements.

The second initial set is determined based on the discrete time set and the first initial set.

In some embodiments, the second initial set is obtained in the following manner:

determining a third initial set, where the third initial set includes elements other than the j target elements in the discrete time set; and determining the second initial set based on the first initial set and the third initial set.

In an example, the determining the second initial set based on the first initial set and the third initial set includes:

deleting any element from the first initial set, and adding any element in the third initial set to a tail of a first initial set obtained after the element is deleted, to obtain the second initial set.

For example, a process of determining the first initial set and the second initial set is described by using j=3, the selected set B=[0 −175 −87.5 −62.5 −200 −187.5 −100 −50 −12.5 −−37.5 −75 −150 −125 −162.5 −137.5] including the M target elements in S230, and the foregoing exampled discrete time set Q=[0 −12.5 −25 −37.5 −50 −62.5 −75 −87.5 −100 −112.5 −125 −137.5 −150 −162.5 −175 −187.5 −200] as an example.

The first initial set is denoted as a set T, the second initial set is denoted as a time T', and the third initial set is denoted as Q.

The first initial set T is T=[0 −175 −87.5], and the third initial set Q is Q=[−12.5 −25 −37.5 −50 −62.5 −75 −100 −112.5 −125 −137.5 −150 −162.5 −187.5 −200].

The element 0 in the first initial set T is deleted to obtain a set [−175 −87.5], and the element −12.5 in the third initial set Q' is added to the set [−−175 −87.5], to obtain the second initial set T'=[−175 −87.5 −12.5].

3. Determine, Based on the First Initial Set and the Second Initial Set, the CSD Set Corresponding to the j Antennas, where the CSD Set Includes j CSD Values.

A first criterion value corresponding to the first initial set and a first criterion value corresponding to the second initial set are calculated.

In response to the first criterion value corresponding to the first initial set being less than the first criterion value corresponding to the second initial set, the second initial set is used as a new first initial set, then step 2 and step 3 are repeatedly performed for a preset number of times, and finally j CSD values obtained after the preset number of times are used as the CSD set corresponding to the j antennas.

In response to the first criterion value corresponding to the first initial set being greater than or equal to the first criterion value corresponding to the second initial set, the CSD set corresponding to the j antennas is not calculated, and step 2 and step 3 are continuously performed again until the first criterion value corresponding to the first initial set is less than the first criterion value corresponding to the second initial set, and the second initial set is used as a new first initial set. Then, step 2 and step 3 are repeatedly performed for a preset number of times. In response to the first criterion value corresponding to the first initial set being greater than or equal to the first criterion value corresponding to the second initial set, in response to step 2 being repeatedly performed, an element deleted from the first initial set or an element added to the third initial set should be different from that in the previous step, so that the first criterion value corresponding to the first initial set may possibly be less than the first criterion value corresponding to the second initial set.

The first initial set T=[0 −175 −87.5] and the second initial set T'=[−175 −87.5 −12.5] that are obtained in step 2 are still used as an example. During execution for the first time, in response to a first criterion value corresponding to the first initial set T being less than a first criterion value corresponding to the second initial set T', a new first initial set T=[—175 −87.5 −12.5] is obtained. Step 2 and step 3 continue to be performed for a preset number of times, to obtain a final result. After calculation, a CSD set corresponding to finally obtained three antennas is [0 −175 −87.5].

In this way, the foregoing steps 1 to 3 are performed on each of the L antenna numbers, to obtain a CSD set corresponding to each antenna number.

For example, M=16, and the obtained CSD set corresponding to the 16 antennas is shown in Table 4.

In response to the earlier communication protocol being compatible, only a CSD set corresponding to each antenna number in a new communication protocol needs to be determined, where L is less than M−1. The CSD set corresponding to each antenna number is obtained by using the foregoing steps 1 to 3.

In response to a communication protocol with eight antennas being compatible, a CSD set corresponding to M−9 antennas need to be determined.

For example, M=16, and CSD sets corresponding to 9 to 16 antennas is shown in Table 3, or CSD sets corresponding to 9 to 16 antennas is the CSD sets corresponding to the 9 to 16 antennas shown in Table 4.

The foregoing describes in detail the cyclic shift diversity-based communication method according to at least one embodiment with reference to FIG. 1 to FIG. 5.

At least one embodiment provides a cyclic shift diversity-based communication apparatus. In at least one embodiment, the apparatus is configured to implement the steps or procedures corresponding to the receive end in the foregoing method embodiments. In at least one embodiment, the apparatus is configured to implement the steps or procedures corresponding to the transmit end in the foregoing method embodiments.

Figure 6:
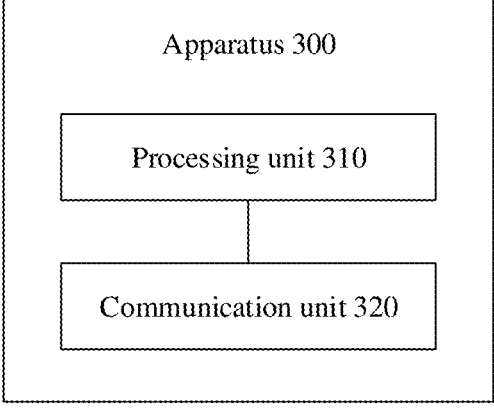
FIG. 6 is a schematic block diagram of a cyclic shift diversity-based communication apparatus according to at least one embodiment.
Figure 7:
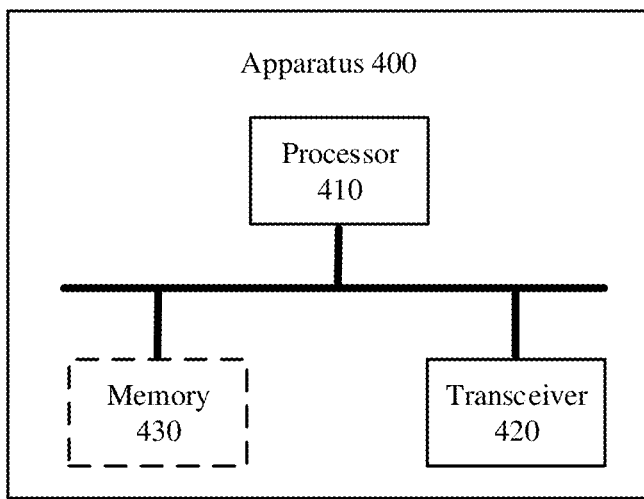
FIG. 7 is a schematic diagram of a structure of a cyclic shift diversity-based communication apparatus according to at least one embodiment.

With reference to FIG. 6 and FIG. 7, the following describes in detail the cyclic shift diversity-based communication apparatus according to at least one embodiment.

FIG. 6 is a schematic block diagram of a cyclic shift diversity-based communication apparatus according to at least one embodiment. As shown in FIG. 6, the apparatus 300 includes a processing unit 310 and a communication unit 320. The communication unit 320 communicates with an external device, and the processing unit 310 is configured to process data. The communication unit 320 is also referred to as a communication interface or a transceiver unit.

In at least one embodiment, the apparatus 300 implements the steps or procedures performed by the transmit end in the foregoing method embodiments. The processing unit 310 is configured to perform processing-related operations of the transmit end in the foregoing method embodiments, and the communication unit 320 is configured to perform receiving/sending-related operations of the transmit end in the foregoing method embodiments.

In some embodiments, the processing unit 310 is configured to generate a physical layer protocol data unit PPDU, where the PPDU includes a first preamble part.

The communication unit 320 is configured to send the PPDU by using N antennas, where cyclic shift is performed, based on a cyclic shift diversity CSD value, on a first preamble part of a PPDU sent on an $i^{th}$ antenna of the N antennas, and N is a positive integer less than or equal to M.

In at least one embodiment, the apparatus 300 implements the steps or procedures performed by the receive end in the foregoing method embodiments. The communication unit 320 is configured to perform receiving/sending-related operations of the receive end in the foregoing method embodiments, and the processing unit 310 is configured to perform processing-related operations of the receive end in the foregoing method embodiments.

In some embodiments, the communication unit 320 is configured to receive a physical layer protocol data unit PPDU, where the PPDU includes a first preamble part, the first preamble part is received based on a cyclic shift diversity CSD value, and the CSD value is a CSD value based on which a transmit end sends the first preamble part.

The processing unit 310 is configured to process the PPDU.

In the foregoing embodiments, optionally, M=16, and the CSD value belongs to a CSD set.

Optionally, N=9, and the CSD value in the CSD set includes: 0, −175 ns, −87.5 ns, −62.5 ns, −200 ns, −187.5 ns, −100 ns, −50 ns, and −12.5 ns;

N=10, and the CSD value in the CSD set includes: 0, −175 ns, −87.5 ns, −62.5 ns, −200 ns, −187.5 ns, −100 ns, −50 ns, −12.5 ns, and −25 ns;

N=11, and the CSD value in the CSD set includes: 0, −175 ns, −87.5 ns, −200 ns, −187.5 ns, −100 ns, −50 ns, −12.5 ns, −25 ns, −37.5 ns, and −125 ns;

N=12, and the CSD value in the CSD set includes: 0, −175 ns, −200 ns, −187.5 ns, −100 ns, −50 ns, −12.5 ns, −25 ns, −37.5 ns, −75 ns, −162.5 ns, and −112.5 ns;

N=13, and the CSD value in the CSD set includes: 0, −87.5 ns, −200 ns, −187.5 ns, −100 ns, −50 ns, −12.5 ns, −25 ns, −37.5 ns, −75 ns, −162.5 ns, −125 ns, and −137.5 ns;

N=14, and the CSD value in the CSD set includes: 0, −175 ns, −62.5 ns, −200 ns, −187.5 ns, −100 ns, −50 ns, −12.5 ns, −25 ns, −37.5 ns, −75 ns, −150 ns, −112.5 ns, and −162.5 ns;

N=15, and the CSD value in the CSD set includes: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, and −137.5 ns; or N=16, and the CSD value in the CSD set includes: 0, −175 ns, −62.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

Optionally, N=1, and the CSD value in the CSD set includes 0;

N=2, and the CSD value in the CSD set includes: 0, −175 ns;

N=3, and the CSD value in the CSD set includes: 0, −175 ns, and −87.5 ns;

N=4, and the CSD value in the CSD set includes: 0, −175 ns, −87.5 ns, and −62.5 ns;

N=5, and the CSD value in the CSD set includes: 0, −175 ns, −87.5 ns, −62.5 ns, and −200 ns;

N=6, and the CSD value in the CSD set includes: 0, −87.5 ns, −200 ns, −187.5 ns, −125 ns, and −12.5 ns;

N=7, and the CSD value in the CSD set includes: 0, −87.5 ns, −62.5 ns, −200 ns, −187.5 ns, −100 ns, and −150 ns;

N=8, and the CSD value in the CSD set includes: 0, −200 ns, −187.5 ns, −100 ns, −50 ns, −25 ns, −125 ns, and −150 ns;

N=9, and the CSD value in the CSD set includes: 0, −175 ns, −87.5 ns, −200 ns, −187.5 ns, −100 ns, −50 ns, −12.5 ns, and −25 ns;

N=10, and the CSD value in the CSD set includes: 0, −175 ns, −200 ns, −187.5 ns, −100 ns, −50 ns, −12.5 ns, −25 ns, −137.5 ns, and −162.5 ns;

N=11, and the CSD value in the CSD set includes: 0, −87.5 ns, −200 ns, −187.5 ns, −100 ns, −50 ns, −12.5 ns, −25 ns, −37.5 ns, −137.5 ns, and −150 ns;

N=12, and the CSD value in the CSD set includes: 0, −175 ns, −87.5 ns, −200 ns, −187.5 ns, −100 ns, −12.5 ns, −25 ns, −37.5 ns, −75 ns, −150 ns, and −162.5 ns;

N=13, and the CSD value in the CSD set includes: 0, −175 ns, −62.5 ns, −187.5 ns, −100 ns, −50 ns, −12.5 ns, −25 ns, −37.5 ns, −75 ns, −150 ns, −162.5 ns, and −125 ns;

N=14, and the CSD value in the CSD set includes: 0, −175 ns, −87.5 ns, −187.5 ns, −100 ns, −50 ns, −12.5 ns, −25 ns, −37.5 ns, −75 ns, −150 ns, −125 ns, −162.5 ns, and −137.5 ns;

N=15, and the CSD value in the CSD set includes: 0, −175 ns, −87.5 ns, −200 ns, −187.5 ns, −100 ns, −50 ns, −12.5 ns, −25 ns, −75 ns, −125 ns, −162.5 ns, −137.5 ns, −112.5 ns, and −150 ns; or N=16, and the CSD value in the CSD set includes: 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

Optionally, the first preamble part includes: a legacy short training field L-STF, a legacy long training field L-LTF, a legacy signal field L-SIG, a repeated legacy-signal field RL-SIG, and a universal signal field U-SIG.

Optionally, the first preamble part further includes an extremely high throughput signal field EHT-SIG.

the apparatus 300 herein is embodied in a form of a functional unit. The term "unit" herein refers to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art understands that the apparatus 300 is specifically the transmit end in the foregoing embodiments, and is configured to perform the procedures and/or steps corresponding to the transmit end in the foregoing method embodiments. Alternatively, the apparatus 300 is specifically the receive end in the foregoing embodiments, and is configured to perform the procedures and/or steps corresponding to the receive end in the foregoing method embodiments. To avoid repetition, details are not described herein again.

The apparatus 300 in each of the foregoing solutions has a function of implementing the corresponding steps performed by the transmit end in the foregoing method, or the apparatus 300 in each of the foregoing solutions has a function of implementing the corresponding steps performed by the receive end in the foregoing method. The function is implemented by hardware, or is implemented by hardware executing corresponding software. The hardware or software includes one or more modules corresponding to the foregoing function. For example, the communication unit is replaced with a transceiver (for example, a sending unit of the communication unit is replaced with a transmitter, and a receiving unit of the communication unit is replaced with a receiver), and another unit such as the processing unit is replaced with a processor, to separately perform sending/receiving operations and processing-related operations in the method embodiments.

In addition, the communication unit is alternatively a transceiver circuit (which includes, for example, a receiving circuit and a transmitter circuit), and the processing unit is a processing circuit. In at least one embodiment, the apparatus in FIG. 7 is the receive end or the transmit end in the foregoing embodiments, or is a chip or a chip system, for example, a system on chip (system on chip, SoC). The communication unit is an input/output circuit or a communication interface. The processing unit is a processor, a microprocessor, or an integrated circuit integrated on the chip. This is not limited herein.

FIG. 7 shows a cyclic shift diversity-based apparatus 400 according to at least one embodiment. The apparatus 400 includes a processor 410 and a transceiver 420. The processor 410 and the transceiver 420 communicate with each other through an internal connection path, and the processor 410 is configured to execute instructions, to control the transceiver 420 to send a signal and/or receive a signal.

Optionally, the apparatus 400 further includes a memory 430. The memory 430 communicates with the processor 410 and the transceiver 420 through internal connection paths. The memory 430 is configured to store instructions, and the processor 410 executes the instructions stored in the memory 430. In at least one embodiment, the apparatus 400 is configured to implement procedures and steps corresponding to the transmit end in the foregoing method embodiment. In at least one embodiment, the apparatus 400 is configured to implement procedures and steps corresponding to the receive end in the foregoing method embodiment.

the apparatus 400 is specifically the transmit end or the receive end in the foregoing embodiments, or is a chip or a chip system. Correspondingly, the transceiver 420 is a transceiver circuit of the chip. This is not limited herein. Specifically, the apparatus 400 is configured to perform the steps and/or the procedures corresponding to the transmit end or the receive end in the foregoing method embodiments. Optionally, the memory 430 includes a read-only memory and a random access memory, and provide instructions and data for the processor. A part of the memory further includes a non-volatile random access memory. For example, the memory may further store information of a device type. The processor 410 is configured to execute the instructions stored in the memory. In response to the processor 410 executing the instructions stored in the memory, the processor 410 is configured to perform the steps and/or procedures of the method embodiment corresponding to the transmit end or the receive end.

In an implementation process, steps in the foregoing methods is implemented by using a hardware integrated logical circuit in the processor, or by using instructions in a form of software. The steps of the method disclosed with reference to at least one embodiment is directly performed by a hardware processor, or is performed by using a combination of hardware in the processor and a software module. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

The processor in at least one embodiment is an integrated circuit chip, and has a signal processing capability. In an implementation process, steps in the foregoing method embodiments is implemented by using a hardware integrated logical circuit in the processor, or by using instructions in a form of software. The processor is a general purpose processor, a digital signal processor (DSP), an application specific integrated circuit (ASIC), a field programmable gate array (FPGA) or another programmable logic device, a discrete gate or a transistor logic device, or a discrete hardware component. The processor in at least one embodiment may implement or perform the methods, the steps, and the logical block diagrams that are disclosed in at least one embodiment. The general-purpose processor is a microprocessor, or the processor is any conventional processor or the like. The steps of the method disclosed with reference to at least one embodiment is directly performed by a hardware decoding processor, or is performed by using a combination of hardware in the decoding processor and a software module. A software module is located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in at least one embodiment is a volatile memory or a nonvolatile memory, or includes a volatile memory and a nonvolatile memory. The nonvolatile memory is a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory is a random access memory (random access memory, RAM), used as an external cache. Through example but not limitative description, many forms of RAMs is used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). The memory of the systems and methods described in this specification includes but is not limited to these and any memory of another proper type.

According to the methods provided in at least one embodiment, a computer program product is provided. The computer program product includes computer program code. In response to the computer program code being run on a computer, the computer is enabled to perform the method in the embodiment shown in FIG. 4.

According to the method provided in at least one embodiment, a computer-readable medium is described. The computer-readable medium stores program code. In response to the program code being run on a computer, the computer is enabled to perform the method in the embodiment shown in FIG. 4.

According to the methods provided in at least one embodiment, a system is described. The system includes the foregoing one or more stations and the foregoing one or more access points.

In at least one embodiment, the "protocol" refers to a standard protocol in the communication field.

In addition, although at least one embodiment is proposed based on the WLAN protocol, in a technically feasible case, at least one embodiment is not limited to the WLAN protocol, and is further applied to another protocol, for example, an LTE protocol, an NR protocol, and a related protocol applied to a future communication system. This is not limited in at least one embodiment.

In at least one embodiment, "predefined" is implemented by prestoring corresponding code or a table in a device (for example, including a station and an access point), or in another manner used for indicating related information. A specific implementation of the foregoing "predefinition" is not limited in at least one embodiment. For example, "predefined" is "defined in a protocol".

"Storing" in at least one embodiment may refer to storing in one or more memories. The one or more memories is separately disposed, or is integrated into an encoder or a decoder, a processor, or a communication apparatus. Alternatively, a part of the one or more memories is separately disposed, and a part of the one or more memories are integrated into the translator, the processor, or the communication apparatus. A type of the memory is a storage medium in any form. This is not limited in at least one embodiment.

The term "at least one" means one or more. The term "at least one of A and B", similar to the term "A and/or B", describes an association relationship between the associated objects and represents that three relationships may exist. For example, at least one of A and B may represent the following three cases: Only A exists, both A and B exist, and only B exists.

A person of ordinary skill in the art is aware that, in combination with the examples described in embodiments disclosed in this specification, units and algorithm steps is implemented by electronic hardware or a combination of computer software and electronic hardware. Whether the functions are performed by hardware or software depends on particular applications and design constraint conditions of the technical solutions. A person skilled in the art is able to use different methods to implement the described functions for each particular application, but the implementation does not goes beyond the scope of this application.

A person skilled in the art understands that, for the purpose of convenient and brief description, for a detailed working process of the foregoing system, apparatus, and unit, refer to a corresponding process in the foregoing method embodiments. Details are not described herein again.

In the several embodiments provided in this application, the disclosed system, apparatus and method is implemented in other manners. For example, the described apparatus embodiment is merely an example. For example, division into the units is merely logical function division and is other division in actual implementation. For example, a plurality of units or components is combined or integrated into another system, or some features is ignored or not performed. In addition, the displayed or discussed mutual couplings or direct couplings or communication connections is implemented by using some interfaces. The indirect couplings or communication connections between the apparatuses or units is implemented in electronic, mechanical, or other forms.

The units described as separate parts may or may not be physically separate, and parts displayed as units may or may not be physical units, is located in one position, or is distributed on a plurality of network units. Some or all of the units is selected based on actual usage to achieve the objectives of the solutions of embodiments.

In addition, functional units in at least one embodiment is integrated into one processing unit, each of the units may exist independently physically, or two or more units is integrated into one unit.

In response to the functions being implemented in the form of a software functional unit and sold or used as an independent product, the functions is stored in a computer-readable storage medium. Based on such an understanding, the technical solutions of this application essentially, or the part contributing to the conventional technology, or some of the technical solutions is implemented in a form of a software product. The computer software product is stored in a storage medium, and includes several instructions for instructing a computer device (which is a personal computer, a server, or a network device) to perform all or some of the steps of the methods described in at least one embodiment. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of at least one embodiment, but are not intended to limit the protection scope of embodiments described herein. Any variation or replacement readily figured out by a person skilled in the art within the technical scope disclosed in at least one embodiment shall fall within the protection scope of at least one embodiment. Therefore, the protection scope of embodiments described herein shall be subject to the protection scope of the claims.

What is claimed is:

1. A cyclic shift diversity-based communication method, wherein a maximum number of antennas supported in the method is M, M is a positive integer greater than 8, and the method comprises:

generating a physical layer protocol data unit (PPDU), wherein the PPDU includes a first preamble part; and sending the PPDU by using N antennas, wherein cyclic shift is performed on the first preamble part of the PPDU using a cyclic shift diversity (CSD) set based on a number of the N antennas to obtain the first preamble part obtained after the cyclic shift, the PPDU being sent on an $i^{th}$ antenna of the N antennas, wherein a CSD value corresponds to the N antennas, and N is a positive integer less than or equal to M.

2. The method according to claim 1, wherein the sending the PPDU by using the N antennas and wherein M=16 and the CSD value belongs to the CSD set.

3. The method according to claim 2, wherein the sending the PPDU by using the N antennas includes:

N=9, and the CSD value in the CSD set includes 0, −175 ns, −87.5 ns, −62.5 ns, −200 ns, −187.5 ns, −100 ns, −50 ns, and −12.5 ns;

N=10, and the CSD value in the CSD set includes 0, −175 ns, −87.5 ns, −62.5 ns, −200 ns, −187.5 ns, −100 ns, −50 ns, −12.5 ns, and −25 ns;

N=11, and the CSD value in the CSD set includes 0, −175 ns, −87.5 ns, −200 ns, −187.5 ns, −100 ns, −50 ns, −12.5 ns, −25 ns, −37.5 ns, and −125 ns;

N=12, and the CSD value in the CSD set includes 0, −175 ns, −200 ns, −187.5 ns, −100 ns, −50 ns, −12.5 ns, −25 ns, −37.5 ns, −75 ns, −162.5 ns, and −112.5 ns;

N=13, and the CSD value in the CSD set includes 0, −87.5 ns, −200 ns, −187.5 ns, −100 ns, −50 ns, −12.5 ns, −25 ns, −37.5 ns, −75 ns, −162.5 ns, −125 ns, and −137.5 ns;

N=14, and the CSD value in the CSD set includes 0, −175 ns, −62.5 ns, −200 ns, −187.5 ns, −100 ns, −50 ns, −12.5 ns, −25 ns, −37.5 ns, −75 ns, −150 ns, −112.5 ns, and −162.5 ns;

N=15, and the CSD value in the CSD set includes 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, and −137.5 ns; or N=16, and the CSD value in the CSD set includes 0, −175 ns, −62.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

4. The method according to claim 2, wherein the sending the PPDU by using the N antennas includes:

N=1, and the CSD value in the CSD set includes 0;

N=2, and the CSD value in the CSD set includes 0, −175 ns;

N=3, and the CSD value in the CSD set includes 0, −175 ns, and −87.5 ns;

N=4, and the CSD value in the CSD set includes 0, −175 ns, −87.5 ns, and −62.5 ns;

N=5, and the CSD value in the CSD set includes 0, −175 ns, −87.5 ns, −62.5 ns, and −200 ns;

N=6, and the CSD value in the CSD set includes 0, −87.5 ns, −200 ns, −187.5 ns, −125 ns, and −12.5 ns;

N=7, and the CSD value in the CSD set includes 0, −87.5 ns, −62.5 ns, −200 ns, −187.5 ns, −100 ns, and −150 ns;

N=8, and the CSD value in the CSD set includes 0, −200 ns, −187.5 ns, −100 ns, −50 ns, −25 ns, −125 ns, and −150 ns;

N=9, and the CSD value in the CSD set includes 0, −175 ns, −87.5 ns, −200 ns, −187.5 ns, −100 ns, −50 ns, −12.5 ns, and −25 ns;

N=10, and the CSD value in the CSD set includes 0, −175 ns, −200 ns, −187.5 ns, −100 ns, −50 ns, −12.5 ns, −25 ns, −137.5 ns, and −162.5 ns;

N=11, and the CSD value in the CSD set includes 0, −87.5 ns, −200 ns, −187.5 ns, −100 ns, −50 ns, −12.5 ns, −25 ns, −37.5 ns, −137.5 ns, and −150 ns;

N=12, and the CSD value in the CSD set includes 0, −175 ns, −87.5 ns, −200 ns, −187.5 ns, −100 ns, −12.5 ns, −25 ns, −37.5 ns, −75 ns, −150 ns, and −162.5 ns;

N=13, and the CSD value in the CSD set includes 0, −175 ns, −62.5 ns, −187.5 ns, −100 ns, −50 ns, −12.5 ns, −25 ns, −37.5 ns, −75 ns, −150 ns, −162.5 ns, and −125 ns;

N=14, and the CSD value in the CSD set includes 0, −175 ns, −87.5 ns, −187.5 ns, −100 ns, −50 ns, −12.5 ns, −25 ns, −37.5 ns, −75 ns, −150 ns, −125 ns, −162.5 ns, and −137.5 ns;

N=15, and the CSD value in the CSD set includes 0, −175 ns, −87.5 ns, −200 ns, −187.5 ns, −100 ns, −50 ns, −12.5 ns, −25 ns, −75 ns, −125 ns, −162.5 ns, −137.5 ns, −112.5 ns, and −150 ns; or N=16, and the CSD value in the CSD set includes 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

5. The method according to claim 1, wherein the sending the PPDU by using the N antennas, wherein the cyclic shift is performed, based on the CSD value, on the first preamble part of the PPDU includes sending the PPDU on the first preamble part that includes a legacy short training field L-STF, a legacy long training field L-LTF, a legacy signal field L-SIG, a repeated legacy-signal field RL-SIG, and a universal signal field U-SIG.

6. The method according to claim 5, wherein the sending the PPDU by using the N antennas, wherein cyclic shift is performed, based on the CSD value, on the first preamble part of the PPDU includes sending the PPDU on the first preamble part that includes an extremely high throughput signal field EHT-SIG.

7. A communication apparatus, applied for a cyclic shift diversity-based communication, wherein a maximum number of antennas supported in the cyclic shift diversity-based communication is M, M is a positive integer greater than 8, the communication apparatus comprising:

at least one processor; and one or more memories coupled to the at least one processor and storing instructions, wherein the at least one processor is configured to execute the instructions to perform operations including:

generating a physical layer protocol data unit (PPDU), wherein the PPDU includes a first preamble part; and sending the PPDU by using N antennas, wherein cyclic shift is performed on the first preamble part of a PPDU using a cyclic shift diversity (CSD) set based on a number of the N antennas to obtain the first preamble part obtained after the cyclic shift, the PPDU being sent on an $i^{th}$ antenna of the N antennas, wherein a CSD value corresponds to the N antennas, and N is a positive integer less than or equal to M.

8. The communication apparatus according to claim 7, wherein M=16 and the CSD value belongs to the CSD set.

9. The communication apparatus according to claim 8, wherein

N=9, and the CSD value in the CSD set includes 0, −175 ns, −87.5 ns, −62.5 ns, −200 ns, −187.5 ns, −100 ns, −50 ns, and −12.5 ns;

N=10, and the CSD value in the CSD set includes 0, −175 ns, −87.5 ns, −62.5 ns, −200 ns, −187.5 ns, −100 ns, −50 ns, −12.5 ns, and −25 ns;

N=11, and the CSD value in the CSD set includes 0, −175 ns, −87.5 ns, −200 ns, −187.5 ns, −100 ns, −50 ns, −12.5 ns, −25 ns, −37.5 ns, and −125 ns;

N=12, and the CSD value in the CSD set includes 0, −175 ns, −200 ns, −187.5 ns, −100 ns, −50 ns, −12.5 ns, −25 ns, −37.5 ns, −75 ns, −162.5 ns, and −112.5 ns;

N=13, and the CSD value in the CSD set includes 0, −87.5 ns, −200 ns, −187.5 ns, −100 ns, −50 ns, −12.5 ns, −25 ns, −37.5 ns, −75 ns, −162.5 ns, −125 ns, and −137.5 ns;

N=14, and the CSD value in the CSD set includes 0, −175 ns, −62.5 ns, −200 ns, −187.5 ns, −100 ns, −50 ns, −12.5 ns, −25 ns, −37.5 ns, −75 ns, −150 ns, −112.5 ns, and −162.5 ns;

N=15, and the CSD value in the CSD set includes 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, and −137.5 ns; or N=16, and the CSD value in the CSD set includes 0, −175 ns, −87.5 ns, −62.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

10. The communication apparatus according to claim 8, wherein

N=1, and the CSD value in the CSD set includes 0;

N=2, and the CSD value in the CSD set includes 0, −175 ns;

N=3, and the CSD value in the CSD set includes 0, −175 ns, and −87.5 ns;

N=4, and the CSD value in the CSD set includes 0, −175 ns, −87.5 ns, and −62.5 ns;

N=5, and the CSD value in the CSD set includes 0, −175 ns, −87.5 ns, −62.5 ns, and −200 ns;

N=6, and the CSD value in the CSD set includes 0, −87.5 ns, −200 ns, −187.5 ns, −125 ns, and −12.5 ns;

N=7, and the CSD value in the CSD set includes 0, −87.5 ns, −62.5 ns, −200 ns, −187.5 ns, −100 ns, and −150 ns;

N=8, and the CSD value in the CSD set includes 0, −200 ns, −187.5 ns, −100 ns, −50 ns, −25 ns, −125 ns, and −150 ns;

N=9, and the CSD value in the CSD set includes 0, −175 ns, −87.5 ns, −200 ns, −187.5 ns, −100 ns, −50 ns, −12.5 ns, and −25 ns;

N=10, and the CSD value in the CSD set includes 0, −175 ns, −200 ns, −187.5 ns, −100 ns, −50 ns, −12.5 ns, −25 ns, −137.5 ns, and −162.5 ns;

N=11, and the CSD value in the CSD set includes 0, −87.5 ns, −200 ns, −187.5 ns, −100 ns, −50 ns, −12.5 ns, −25 ns, −37.5 ns, −137.5 ns, and −150 ns;

N=12, and the CSD value in the CSD set includes 0, −175 ns, −87.5 ns, −200 ns, −187.5 ns, −100 ns, −12.5 ns, −25 ns, −37.5 ns, −75 ns, −150 ns, and −162.5 ns;

N=13, and the CSD value in the CSD set includes 0, −175 ns, −62.5 ns, −187.5 ns, −100 ns, −50 ns, −12.5 ns, −25 ns, −37.5 ns, −75 ns, −150 ns, −162.5 ns, and −125 ns;

N=14, and the CSD value in the CSD set includes 0, −175 ns, −87.5 ns, −187.5 ns, −100 ns, −50 ns, −12.5 ns, −25 ns, −37.5 ns, −75 ns, −150 ns, −125 ns, −162.5 ns, and −137.5 ns;

N=15, and the CSD value in the CSD set includes 0, −175 ns, −87.5 ns, −200 ns, −187.5 ns, −100 ns, −50 ns, −12.5 ns, −25 ns, −75 ns, −125 ns, −162.5 ns, −137.5 ns, −112.5 ns, and −150 ns; or N=16, and the CSD value in the CSD set includes 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

11. The communication apparatus according to claim 7, wherein the first preamble part includes a legacy short training field L-STF, a legacy long training field L-LTF, a legacy signal field L-SIG, a repeated legacy-signal field RL-SIG, and a universal signal field U-SIG.

12. The communication apparatus according to claim 11, wherein the first preamble part further includes an extremely high throughput signal field EHT-SIG.

13. A communication apparatus, applied for a cyclic shift diversity-based communication, the communication apparatus comprising:

at least one processor; and one or more memories coupled to the at least one processor and storing instructions, wherein the at least one processor is configured to execute the instructions to perform operations including:

receiving a physical layer protocol data unit (PPDU), wherein cyclic shift is performed on a first preamble part of the PPDU using a cyclic shift diversity (CSD) set based on a number of N antennas, the first preamble part is received by the N antennas, wherein a CSD value corresponds to the N antennas, and the CSD value is based on which a transmit end sends the first preamble part, N being a positive integer; and processing the PPDU.

14. The communication apparatus according to claim 13, wherein the first preamble part includes a legacy short training field L-STF, a legacy long training field L-LTF, a legacy signal field L-SIG, a repeated legacy-signal field RL-SIG, and a universal signal field U-SIG.

15. The communication apparatus according to claim 14, wherein the first preamble part further includes an extremely high throughput signal field EHT-SIG.

16. The communication apparatus according to claim 13, wherein the CSD value belongs to the CSD set.

17. The communication apparatus according to claim 16, wherein the CSD value in the CSD set includes 0, −175 ns, −87.5 ns, −62.5 ns, −200 ns, −187.5 ns, −100 ns, −50 ns, and −12.5 ns;

the CSD value in the CSD set includes 0, −175 ns, −87.5 ns, −200 ns, −187.5 ns, −100 ns, −50 ns, −12.5 ns, −25 ns, −37.5 ns, and −125 ns;

the CSD value in the CSD set includes 0, −175 ns, −200 ns, −187.5 ns, −100 ns, −50 ns, −12.5 ns, −25 ns, −37.5 ns, −75 ns, −162.5 ns, and −112.5 ns;

the CSD value in the CSD set includes 0, −87.5 ns, −200 ns, −187.5 ns, −100 ns, −50 ns, −12.5 ns, −25 ns, −37.5 ns, −75 ns, −162.5 ns, −125 ns, and −137.5 ns;

the CSD value in the CSD set includes 0, −175 ns, −62.5 ns, −200 ns, −187.5 ns, −100 ns, −50 ns, −12.5 ns, −25 ns, −37.5 ns, −75 ns, −150 ns, −112.5 ns, and −162.5 ns;

the CSD value in the CSD set includes 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, and −137.5 ns; or the CSD value in the CSD set includes 0, −175 ns, −62.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

18. The communication apparatus according to claim 16, wherein the CSD value in the CSD set includes 0;

the CSD value in the CSD set includes 0, −175 ns;

the CSD value in the CSD set includes 0, −175 ns, and −87.5 ns;

the CSD value in the CSD set includes 0, −175 ns, −87.5 ns, and −62.5 ns;

the CSD value in the CSD set includes 0, −175 ns, −87.5 ns, −62.5 ns, and −200 ns;

the CSD value in the CSD set includes 0, −87.5 ns, −200 ns, −187.5 ns, −125 ns, and −12.5 ns;

the CSD value in the CSD set includes 0, −87.5 ns, −62.5 ns, −200 ns, −187.5 ns, −100 ns, and −150 ns;

the CSD value in the CSD set includes 0, −200 ns, −187.5 ns, −100 ns, −50 ns, −25 ns, −125 ns, and −150 ns;

the CSD value in the CSD set includes 0, −175 ns, −87.5 ns, −200 ns, −187.5 ns, −100 ns, −50 ns, −12.5 ns, and −25 ns;

the CSD value in the CSD set includes 0, −175 ns, −200 ns, −187.5 ns, −100 ns, −50 ns, −12.5 ns, −25 ns, −137.5 ns, and −162.5 ns;

the CSD value in the CSD set includes 0, −87.5 ns, −200 ns, −187.5 ns, −100 ns, −50 ns, −12.5 ns, −25 ns, −37.5 ns, −137.5 ns, and −150 ns;

the CSD value in the CSD set includes 0, −175 ns, −87.5 ns, −200 ns, −187.5 ns, −100 ns, −12.5 ns, −25 ns, −37.5 ns, −75 ns, −150 ns, and −162.5 ns;

the CSD value in the CSD set includes 0, −175 ns, −62.5 ns, −187.5 ns, −100 ns, −50 ns, −12.5 ns, −25 ns, −37.5 ns, −75 ns, −150 ns, −162.5 ns, and −125 ns;

the CSD value in the CSD set includes 0, −175 ns, −87.5 ns, −187.5 ns, −100 ns, −50 ns, −12.5 ns, −25 ns, −37.5 ns, −75 ns, −150 ns, −125 ns, −162.5 ns, and −137.5 ns;

the CSD value in the CSD set includes 0, −175 ns, −87.5 ns, −200 ns, −187.5 ns, −100 ns, −50 ns, −12.5 ns, −25 ns, −75 ns, −125 ns, −162.5 ns, −137.5 ns, −112.5 ns, and −150 ns; or the CSD value in the CSD set includes 0, −175 ns, −87.5 ns, −200 ns, −187.5 ns, −100 ns, −50 ns, −12.5 ns, −25 ns, −37.5 ns, −75 ns, −150 ns, −125 ns, −162.5 ns, −137.5 ns, and −112.5 ns.

* * * * *